United States Patent
Harris

(10) Patent No.: US 8,074,879 B2
(45) Date of Patent: *Dec. 13, 2011

(54) SYSTEM AND METHOD FOR SECURING A CREDIT ACCOUNT

(75) Inventor: David N. Harris, Sonora, CA (US)

(73) Assignee: Harris Intellectual Property, LP, Sonora, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/803,219

(22) Filed: Jun. 22, 2010

(65) Prior Publication Data

US 2010/0268647 A1 Oct. 21, 2010

Related U.S. Application Data

(63) Continuation of application No. 11/895,837, filed on Aug. 28, 2007, now Pat. No. 7,753,265, which is a continuation of application No. 10/889,227, filed on Jul. 12, 2004, now Pat. No. 7,264,154.

(51) Int. Cl.
*G06K 5/00* (2006.01)
*G07F 19/00* (2006.01)
*G06F 7/08* (2006.01)

(52) U.S. Cl. .......... 235/380; 379/381; 379/382

(58) Field of Classification Search ....... 235/379–382.5; 705/39, 44

See application file for complete search history.

(56) References Cited

U.S. PATENT DOCUMENTS

| | | | | |
|---|---|---|---|---|
| 6,339,766 | B1* | 1/2002 | Gephart | 705/44 |
| 6,422,462 | B1* | 7/2002 | Cohen | 235/381 |
| 7,264,154 | B2* | 9/2007 | Harris | 235/380 |
| 7,702,578 | B2* | 4/2010 | Fung et al. | 705/39 |
| 7,753,265 | B2* | 7/2010 | Harris | 235/380 |
| 2001/0047330 | A1* | 11/2001 | Gephart et al. | 705/39 |
| 2002/0169720 | A1* | 11/2002 | Wilson et al. | 705/44 |
| 2004/0078325 | A1* | 4/2004 | O'Connor | 705/39 |
| 2004/0133507 | A1* | 7/2004 | Barbour | 705/38 |
| 2004/0148259 | A1* | 7/2004 | Reiners et al. | 705/42 |
| 2006/0261152 | A1* | 11/2006 | Wong | 235/379 |

FOREIGN PATENT DOCUMENTS

| | | | |
|---|---|---|---|
| JP | H10-105627 | A | 4/1998 |
| JP | 2000-306161 | A | 11/2000 |

OTHER PUBLICATIONS

JP Application No. 2007-521513, Office Action dated Jul. 6, 2011 (with English summary).

* cited by examiner

*Primary Examiner* — Thien M. Le
*Assistant Examiner* — April Taylor
(74) *Attorney, Agent, or Firm* — Henneman & Associates, PLC; Larry E. Henneman, Jr.

(57) ABSTRACT

A system and method is disclosed for verifying a commercial transaction between a card-holder, a merchant, and a credit card company. The card-holder makes a purchase with the merchant using a full credit card number. The merchant submits a transaction approval request for approval with the credit card company. The credit card company executes conventional credit approval of the transaction approval request, as well as verifies the transaction approval request with the card-holder. An approval is sent to the merchant only after the transaction approval request is both conventionally approved by the credit card company and verified by the card-holder. The card-holder, or the credit card company, may initiate verification of the transaction approval request. The transaction approval request can also be automatically verified if one or many pre-verification criteria is/are satisfied by data contained in the transaction approval request. The pre-verification criteria can be initially determined and/or modified by the card-holder. As another security feature, the card-holder may selectively activate and deactivate their credit card/account as desired. The credit card itself includes indicia of security measures.

39 Claims, 24 Drawing Sheets

SYSTEM AND METHOD FOR SECURING A CREDIT ACCOUNT

RELATED APPLICATIONS

This application is a continuation of U.S. application Ser. No. 11/895,837 (now U.S. Pat. No. 7,753,265 filed Aug. 28, 2007 by the same inventor, which is a continuation of U.S. application Ser. No. 10/889,227 (now U.S. Pat. No. 7,264,154) filed Jul. 12, 2004 by the same inventor, both of which are incorporated herein by reference in their entireties.

BACKGROUND

1. Field of the Invention

This invention relates generally to electronic commerce, and more particularly to a system and method for providing secure electronic transactions. Even more particularly, the present invention relates a system and method for facilitating verification of an electronic purchase by an account holder.

2. Description of the Background

Electronic commerce, buying and selling by electronic means, has become commonplace in modern society. With the mainstreaming of the Internet (most specifically the World Wide Web), electronic commerce has made its way into the home or office of any person with a computer. For several reasons, more and more people are choosing to do business (e.g. shopping) from their home or office computer. For example, consumers are attracted to Internet commerce because Internet based businesses typically offer items at discounted prices. In addition, the Internet is accessible twenty-four hours a day, enabling the consumer to make purchases at their convenience.

The primary means of payment for most consumer electronic purchases is a credit card. The credit card represents a prearranged credit account of the card-holder. The card-holder makes an electronic purchase with a merchant, using a credit card. The merchant submits the purchase request (including transmitting the entire credit card number) to the credit card company for purchase authorization. The credit card company then authorizes or denies the credit card transaction with the merchant. If the purchase is approved the prearranged credit account is debited in the amount of the purchase.

Credit cards offer many advantages to card-holders. For example, persons having access to a credit card spend less time at the bank, as well as, balancing checking and savings accounts. In addition, a credit card eliminates the need to carry large sums of cash. Further, purchase approval is automated when using a credit card while purchase approval with check or money order is delayed. Therefore, when making a purchase by phone or mail order, using a credit card eliminates the delay associated with sending payment through the mail.

As a result of increased electronic commerce, credit card security has become a major concern for card-holders. Some card-holders are wary of purchasing items over the Internet using their credit cards for fear of interception and unauthorized use of their credit card number. Their fears are justified because the language, in which most Internet web pages are written, HyperText Markup Language (HTML), uses vulnerable methods of transferring information. To combat Internet security issues some merchant networks use encryption techniques to secure transactions made over the Internet. This offers little comfort to the concerned consumer, because such encryption techniques can be deciphered by sophisticated criminals. Further, even if the transmission of the credit card number is secure, the card number is still stored on the receiving computer, and could be stolen by breaking into that computer. Additionally, credit card numbers can be stolen directly from the card by such devices as pocket scanners used by dishonest waiters, store clerks and the like.

Some commercial accounts (e.g. checking accounts) offer debit cards that face the same, if not increased, security risks as credit cards. Debit cards are similar to credit cards, however to complete a debit transaction, the card-holder's Personal Identification Number (PIN) must be given in addition to the card number at the time of purchase. In addition, the debit card draws funds from the account (typically a checking account) that it is linked to. In many cases the PIN given with debit card transactions is the same PIN used to access (e.g. via ATM machine or phone) the account that the debit card is linked to. If a purchase transaction made using a debit card is intercepted and used fraudulently, the thief has the ability to both make purchases using the debit card number and PIN, as well as, draw funds directly from the associated debit account.

The concern for improved credit card safety has put pressure on credit card companies and merchants to provide methods of ensuring secure electronic transactions. For example, U.S. Pat. No. 6,012,144 (Pickett) describes a method of maintaining Internet credit card transaction security by splitting the credit card number into two pieces and storing each piece on a separate data storage device of one or more server computers. The card-holder decides which portions of the credit card number will be sent to each storage device and then secures several processing codes (passwords). The processing codes are later obtained from the card-holder by an automated telephone call so that the purchase may be verified. There are several disadvantages to this methodology. First, Pickett's method is extremely time consuming for the card-holder because the full credit card number is not transmitted to the merchant in its entirety. Rather, the card-holder must parse the credit card number and calculate a slicing code. In addition, the card-holder must remember the slicing code, which may be different for each transaction, in order to verify the transaction. Further, the burden of providing the security software falls on the merchant, which may or may not be willing to provide such a system. Thus, no security is provided if the card-holder wishes to purchase from a merchant without such a system.

U.S. Pat. No. 5,903,721 (Sixtus) describes an alternate method of providing improved credit card transaction security. The method of Sixtus involves a card-holder making a purchase over the Internet. A "trust server", used to verify the card-holder, receives a purchase request along with the card-holder's IP (Internet Protocol) address. If the IP address received by the trust server matches a registered IP address for that card-holder, the purchase is verified and forwarded to a "Credit Clearinghouse" where the purchase is approved or disapproved. While no sensitive credit card information is transmitted over an unsecured network, transactions can only be made from the computer having the IP address registered with the trust server. In addition, some Internet Service Providers (ISP) use dynamic IP addressing, wherein a temporary IP address is assigned as the user logs onto the ISP's network. Thus, a card-holder having an Internet Service Provider that utilizes dynamic IP addressing is unable to use the transaction security system taught by Sixtus.

As another example, U.S. Pat. No. 5,991,738 (Ogram) teaches a method utilizing encryption software. A card-holder, wishing to purchase an item from a merchant employing Ogram's methodology, downloads encryption software from the merchant computer. The encryption software encodes any sensitive information before transmission to the merchant. One disadvantage of Ogram's methodology is the lack of a secured purchase verification process with the card-holder. In addition, the employed encryption techniques can be intercepted and deciphered during transmission.

What is needed is a system and method for providing safe and secure credit card transaction processing. What is also needed is a system and method for providing safe and secure credit card transactions that are transparent to merchants. What is also needed is a system and method for facilitating card-holder verification of credit card transactions and providing prompt notice of each attempted use of a card-holder's credit card.

SUMMARY

The present invention overcomes the problems associated with the prior art by providing a system and method for providing safe and secure credit card transaction processing which is transparent to the merchant. The invention facilitates card-holder verification of each credit card transaction prior to transmitting an approval to the merchant, and provides prompt notice of each attempted use of the credit card to the account-holder.

A computer system is disclosed, for processing a commercial transaction between an account-holder and a merchant, comprising a processing unit to execute data and code, and a memory device for storing data and code. The stored and executed code includes a merchant communications module operative to receive a transaction approval request, including an entire account number, an account-holder communications module operative to facilitate a separate connection with the account-holder for verifying the received transaction approval request, and an authorization module responsive to the transaction approval request and operative to transmit an approval to the merchant only if the transaction approval request is verified by the account-holder.

In a particular embodiment, the authorization module includes an interactive verification module, responsive to the receipt of a transaction approval request and operative to initiate a connection with the account-holder. In a more particular embodiment, the computer system further includes a network interface, and the interactive verification module is operative to transmit an electronic message to the account-holder via the network interface, and is further operative to verify the transaction approval request upon receipt of a reply to the transmitted electronic message.

In another particular embodiment, the computer system further comprises a telecommunications device and the interactive verification module is operative to place an automated telephone call to the account-holder, recite a portion of the transaction approval request to the account-holder, and receive verification instructions from the account holder. In a more particular embodiment, the interactive verification module is operative to require an authentication code before reciting a portion of the transaction approval request.

Optionally, the interactive verification module waits for the account-holder to initiate communication with the system. Alternatively, the system initiates communication with the account-holder to verify pending transaction approval requests.

In a particular embodiment, the authorization module, responsive to instructions from the account holder, can selectively disable the verification process by automatically verifying subsequent transaction approval requests without further input form the account holder.

In yet another particular embodiment, the authorization module includes a master verification module that automatically disclaims a transaction approval request if the account holder has not verified the transaction approval request prior to the lapse of a predetermined time period. The master verification module is further operative to transmit notice to the account holder when the transaction approval request is disclaimed.

In yet another particular embodiment, a transaction approval request comprises a verification request from a third party financial institution, and the authorization module is operative to transmit indicia of verification to the third party financial institution.

A method is also disclosed for providing safe and secure commercial transactions between an account-holder and a merchant. The method includes receiving a transaction approval request including a full account number identifying the account-holders account, electronically verifying the transaction approval request with the account-holder via a separate communication from the merchant, and transmitting an approval to the merchant only if the transaction approval request is verified by the account-holder.

In a particular method, the step of verifying the transaction approval request with the account-holder includes prompting the account-holder to verify the transaction approval request. In a more particular method, prompting the account-holder includes sending an electronic message. In yet a more particular method, the step of verifying the transaction approval request includes receiving a reply to the electronic message. In another particular method, prompting the account-holder includes placing an automated telephone call to the account-holder, establishing a connection with the account-holder, reciting at least a portion of the transaction approval request, and receiving verification instructions from the account-holder. In an even more particular method, the account holder is authenticated before the recitation of at least a portion of the transaction approval request.

An alternate method includes waiting for the account-holder to initiate the verification process by communicating with the computer system. In a particular method verification is initiated by the account-holder over a network or a telephone connection and includes, receiving a connection request from the account-holder via a network or telecommunications device, establishing a connection with the account-holder, authenticating the account-holder, transmitting at least a portion of the transaction approval request to the account-holder, and receiving verification instructions from the account-holder with respect to the transaction approval request.

Optionally, the verification process can be selectively enabled or disabled by the account holder.

In another particular method, the step of electronically verifying the transaction approval request includes disclaiming the transaction approval request if the account holder does not verify the transaction approval request within a predetermined time interval. In a more particular method notice is transmitted to the account-holder when the transaction approval request has been disclaimed.

In yet another particular method, the step of receiving a transaction approval request from the merchant comprises receiving a verification request from a third party financial institution that received the transaction approval request from the merchant. The step of transmitting an approval to the merchant comprises transmitting indicia of verification to the third-party financial institution.

A system and method for pre-verifying certain transactions between a merchant and an account-holder is also disclosed.

In a particular embodiment, a computer system includes a processing unit for processing data and code, and a memory device for storing the data and code. The data includes at least one pre-verification criteria associated with the account-holder. The code includes a merchant communications module for receiving a transaction approval request from the merchant, and an authorization module. The authorization module compares the transaction approval request with the pre-verification criteria, and automatically verifies the transaction approval request if the pre-verification criteria are met, thereby eliminating the need to obtain direct verification of the transaction approval request from the account-holder prior to completing the approval process.

In a particular embodiment, the pre-verification criteria includes a plurality of pre-verification criteria associated with the account-holder, and the transaction approval request is verified if any one of the pre-verification criteria are satisfied. In an alternate embodiment, the transaction approval request is not automatically verified unless all of the plurality of pre-verification criteria are satisfied. Examples of useful pre-verification criteria include, but are not limited to, merchant identifiers, transaction amounts (e.g., purchase prices), transaction dates, transaction times, or any other criteria that an account-holder might find convenient. Optionally, the code further includes a card-holder communications module and/or an interactive verification module that facilitates modification of the pre-verification criteria by the account-holder. In one embodiment, the pre-verification criteria are initially set so that no transaction approval request can be automatically verified until the pre-verification criteria are modified by the account-holder. As an alternative, the initial pre-verification criteria can be determined by the account-holder (e.g., when the account is opened).

A system and method for selectively activating and deactivating the account-holder's account is also disclosed. A computer system includes a processing unit for processing data and code, and a memory device for storing the data and code. The data includes activation data accessible to the account-holder that is indicative of the activation status of the account-holder's account. The code includes a merchant communications module for receiving a transaction approval request from the merchant, and an authorization module. The authorization module approves or denies the transaction approval request based at least in part on the activation data and the associated activation status of the account, thereby permitting the account-holder to temporarily activate and deactivate their account as desired.

In a particular embodiment, the activation data includes at least one activation condition (e.g., an activation date and time), and the authorization module is operative to approve the transaction approval request if the transaction approval request satisfies the activation condition (e.g., the purchase date and time is after the activation date and time). In another particular embodiment the activation data also includes at least one deactivation condition (e.g., a deactivation date and time), and the authorization module will approve the transaction approval request only if the transaction approval request satisfies the activation condition and does not satisfy the deactivation condition (e.g., the purchase date and time falls before the deactivation date and time).

In another particular embodiment, the account-holder can specify automatic activation or deactivation criteria which the authorization module can implement automatically. One possible deactivation criteria is a predetermined number of transaction approval requests (e.g., one) received by the computer system, and then the authorization module is operative to automatically deactivate the account-holder's account.

In yet another particular embodiment, the authorization module includes an interactive activation module operative to establish a connection with the account-holder, authenticate the account-holder, present the current activation status of the account-holder's account to the account holder, and receive instructions from the account holder to modify the activation data. The connection between the account-holder and the interactive activation module can be established, for example, by telephone. In a more particular embodiment, the interactive activation module is operative to store instructions (e.g., the activation or deactivation date and time) received from the account-holder.

A method is also disclosed for facilitating commercial transactions between an account-holder and a merchant including the steps of receiving deactivation instructions from the account-holder to temporarily deactivate their account, receiving a transaction approval request from a merchant, determining whether the account holder has temporarily deactivated the account, and denying the transaction approval request if the account is temporarily deactivated.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a novel system and method of providing safe and secure electronic transactions by verifying each electronic transaction with the account-holder. In the following description, numerous specific details are set forth (e.g. verification processed by credit card company, verification initiated by card-holder, etc.) in order to provide a thorough understanding of the invention. Those skilled in the art will recognize, however, that the invention may be practiced apart from these specific details. In other instances, details of well-known electronic commerce practices (e.g. electronic credit request/approval processes, computer operating systems, communication software, etc.) have been omitted, so as not to unnecessarily obscure the present invention.

Figure 1:
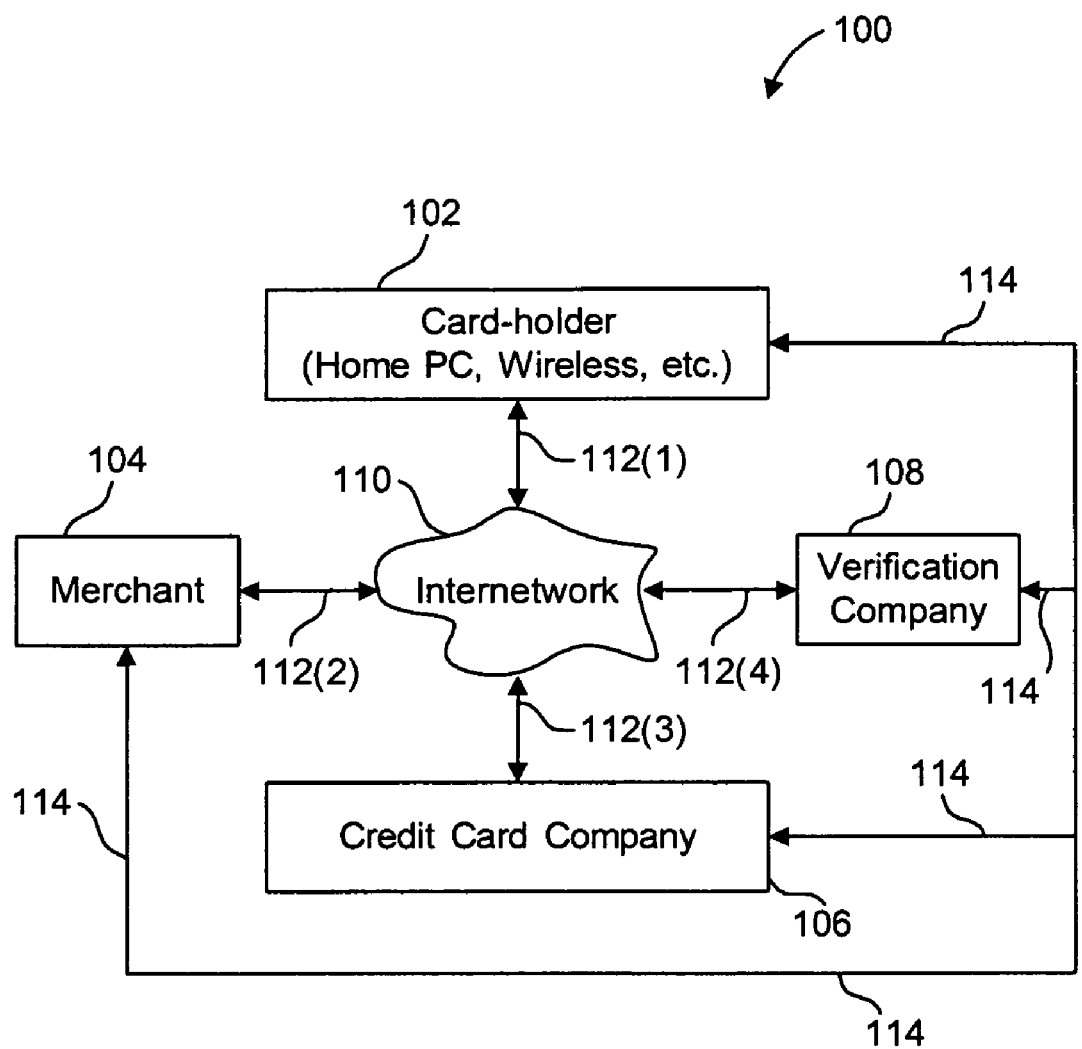
FIG. 1 is a block diagram of an internetwork between, a card-holder, a merchant, a credit card company, and a third party verification company according to the present invention.

FIG. 1 is a block diagram showing a system 100 including a card-holder 102, a merchant 104, a credit card company 106, and a third-party verification company 108, each connected to an internetwork 110 (e.g., the Internet) by physical network media 112(1-4) (e.g. telephone line, coaxial cable, etc.). Card-holder 102, merchant 104, credit card company 106, and verification company 108 are also in communication via another physical network media 114 (e.g. a telephone line).

Card-holder 102 possesses a credit card with a number identifying an account provided by credit card company 106. Merchant 104 offers goods or services which can be purchased via internetwork 110 by card-holder 102 using the credit card number. Card-holder 102 makes an electronic purchase request from merchant 104, by providing the entire credit card number. This purchase may be made over internetwork 110, physical network media 114, or even in person. Responsive to receipt of the purchase request, merchant 104 submits a transaction approval request (TAR) to credit card company 106.

The TAR then undergoes a two-part authorization before an approval or denial is issued to merchant 104. First, the purchase request undergoes standard credit approval by credit card company 106. Following credit approval, the purchase request is verified with card-holder 102 either by credit card company 106, or by verification company 108. Verification is executed either over internetwork 110 or physical network media 114. Following verification, if the purchase is both approved by credit card company 106 and verified by card-holder 102, an approval is transmitted to merchant 104 via physical network media 114 or internetwork 110:

In this particular embodiment a credit card facilitates electronic commerce. Those skilled in the art will realize that the present invention is not, however, limited to purchases made using credit cards. The present invention may be used in conjunction with any type of account (e.g. debit cards) to facilitate safe and secure electronic transactions that include transmission of an account number. It is further understood that in the following description, credit card company 106 executes the verification process. However, the verification process may optionally be performed by third party verification company 108. In such an embodiment, credit card company 106 transmits a verification request to verification company 108. Verification company 108 then verifies the transaction request with card-holder 102, and transmits indicia of verification (indicating whether the transaction request has been verified, disclaimed, etc.) back to credit card company 106.

Figure 2:
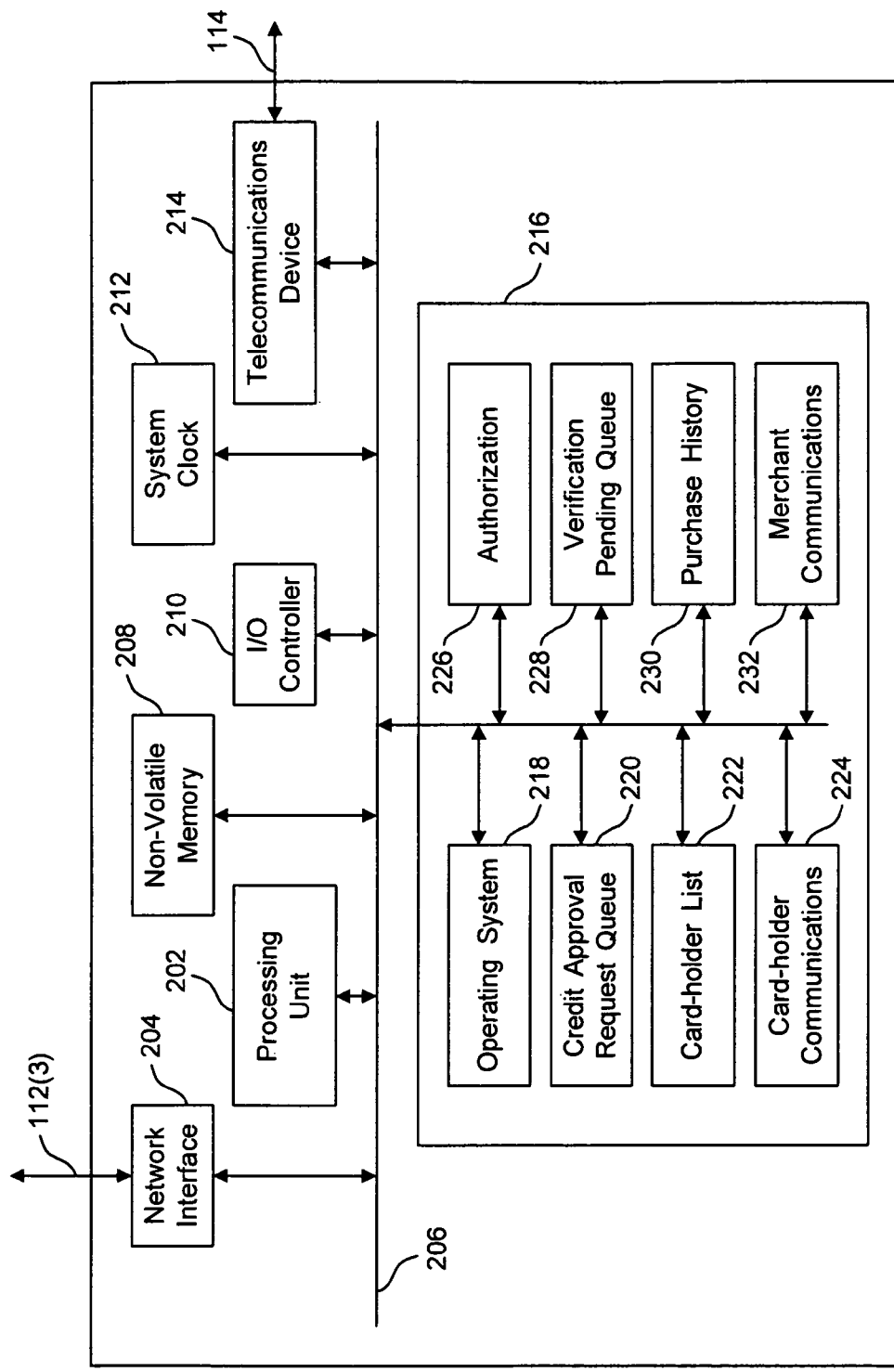
FIG. 2 is a block diagram showing a server of the credit card company of FIG. 1, to include a working memory and an authorization module within said working memory.

FIG. 2 is a block diagram of a server 200 (e.g. an HTTP Internet Server) connected to internetwork 110 via physical network media 112(3). In this particular embodiment server 200 is a transaction server of credit card company 106, for processing credit card transactions for credit card company 106. Server 200 includes a processing unit (PU) 202, a network interface 204, a system bus 206, non-volatile memory 208, at least one input/output (I/O) controller 210, a system clock 212, a telecommunications device 214, and a working memory 216. PU 202 executes data and code contained in working memory 216 to cause server 200 to carry out its intended functions (e.g. processing credit card transactions). System bus 206 facilitates intercommunication between the various components of server 200.

Server 200 communicates over Internetwork 110 via network interface 204. Network interface 204 (e.g. an Ethernet adapter card) transmits data packets onto and receives data packets from internetwork 110, thus allowing server 200 to communicate with card-holder 102 and merchant 104 via internetwork 110. Non-volatile memory 208 (e.g. read-only memory, or one or more hard disk drives) provides storage for data and code (e.g., boot code and programs) that are retained even when server 200 is powered down. I/O controller 210 manages connections for user interface devices (not shown) for a system administrator of server 200. I/O devices typically include a keyboard, mouse, monitor, printer, and other such devices that facilitate communications between server 200 and an administrator. Server 200 further includes a system clock 212 that maintains proper date and time, and provides date and time data upon request.

Server 200 further includes a telecommunications device 214 (e.g. a modem, or telephone) for establishing either a data or voice connection between a remote system or party and server 200. Examples of remote systems include a computer owned by card-holder 102, merchant 104, or verification company 108. In a particular embodiment, a voice connection with card-holder 102 is used to verify pending TARs.

Working memory 216 (e.g. random access memory) provides dynamic memory to server 200, and includes executable code (e.g. an operating system 218), which is loaded into working memory 216 during system start-up. Operating system 218 facilitates control and execution of all other modules loaded into working memory 216. Working memory 216 further includes a Credit Approval Request Queue (CARQ) 220, a card-holder list module 222, a card-holder communications module 224, an authorization module 226, a verification pending queue (VPQ) 228, a purchase history module 230, and a merchant communications module 232. Each of the foregoing modules and queues are initialized and loaded into working memory 216 at startup from non-volatile memory 208 using methods well known to those skilled in the art. Optionally, the foregoing modules and queues can be loaded into working memory 216 from alternate mass data storage devices including, but not limited to, a CD-ROM, a tape, or a drive having high capacity removable data storage disks (e.g. Iomega's Jaz™ or Zip™ drives).

Authorization module 226 controls and coordinates the approval and verification of TARs. As described above, in the alternate embodiment where verification is processed by third-party verification company 108, authorization module 226 is operative to transmit a request for verification to verification company 108 and receive indicia of verification from verification company 108. The transmitted request for verification would include information related to the purchase request such as a product description, purchase price, merchant's name, or any other information helpful to identify the transaction to the card-holder for verification. The received indicia of verification would include, for example, a code indicating that the particular transaction has been verified or disclaimed by the card-holder. Optionally, authorization module, responsive to instructions given by card-holder 102, is further operative to selectively disable the verification process (e.g., automatically verify every transaction or transactions for a particular merchant). Instructions to disable the verification process would generally be initiated by card-holder 102 over a secure network (e.g. via telephone, or mail).

Merchant communications module 232 receives TARs from and transmits approvals or denials to merchant 104 via network interface 204 or telecommunications device 214. Card-holder Communications module 224 manages communications between server 200 and card-holder 102, via internetwork 110 or physical network media 114. Card-holder list module 222 is a database for storing personal and account information for current customers of credit card company 106, including card-holder 102. Those skilled in the art will understand that card-holder list module 222 would typically be a very large file. Therefore, while card-holder list module 222 is shown in memory 216, it should be understood that the entire customer files would likely be stored in a mass data storage system such as non-volatile memory 208, with portions of the entire list being swapped in and out of card-holder list 222 as necessary.

Credit Approval Request Queue (CARQ) 220 provides storage for pending TARs awaiting conventional credit approval by authorization module 226. Merchant communications module 232 periodically polls network interface 204 and telecommunications device 214 to determine whether there are any incoming TARs from merchant 104, and transfers any such requests to CARQ 220.

Verification Pending Queue (VPQ) 228 provides storage for pending TARs awaiting verification by card-holder 102. Authorization module 226 transfers TARs from CARQ 220 to VPQ 228 after the TAR is confirmed as corresponding to a valid account and passes conventional credit approval. TARs remain in VPQ 228 until verified, denied, or until the lapse of a predetermined time period.

Once a TAR is approved or denied, a record of the TAR is transferred to purchase history module 230. Purchase history module 230 stores information about previous account activity, for a predetermined time period (e.g. a period of thirty days). Upon lapse of the predetermined time period, at which point a written record (e.g. a bill, an e-bill, etc.) of the transaction has been conveyed to card-holder 102, each expired TAR is transferred from working memory 216 to a more permanent storage media (e.g., magnetic tape).

Figure 3:
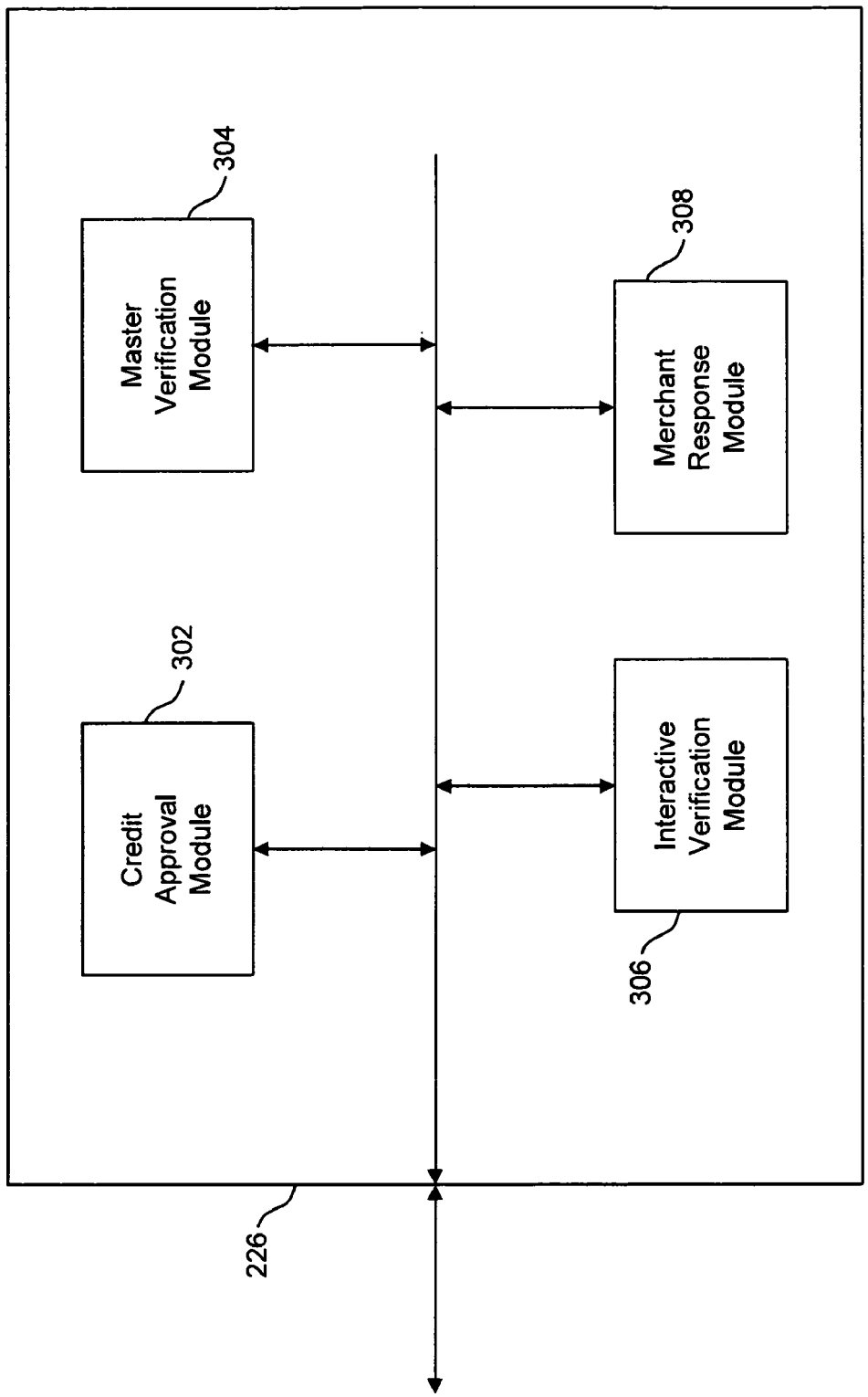
FIG. 3 is a block diagram detailing the authorization module shown in FIG. 2.

FIG. 3 shows a block diagram of authorization module 226 to include a credit approval module 302, a master verification module 304, an interactive verification module 306, and a merchant response module 308. Credit approval module 302 executes conventional credit approval for each TAR contained in CARQ 220 by means well known to those skilled in the art. Master verification module 304 coordinates the authorization and verification processes, and is responsible for overall control of authorization module 226. Interactive verification module 306 carries out verification with card-holder 102. Merchant response module 308 initiates final communication with merchant 104 by transmitting either a transaction approval or a transaction denial.

Figure 4:
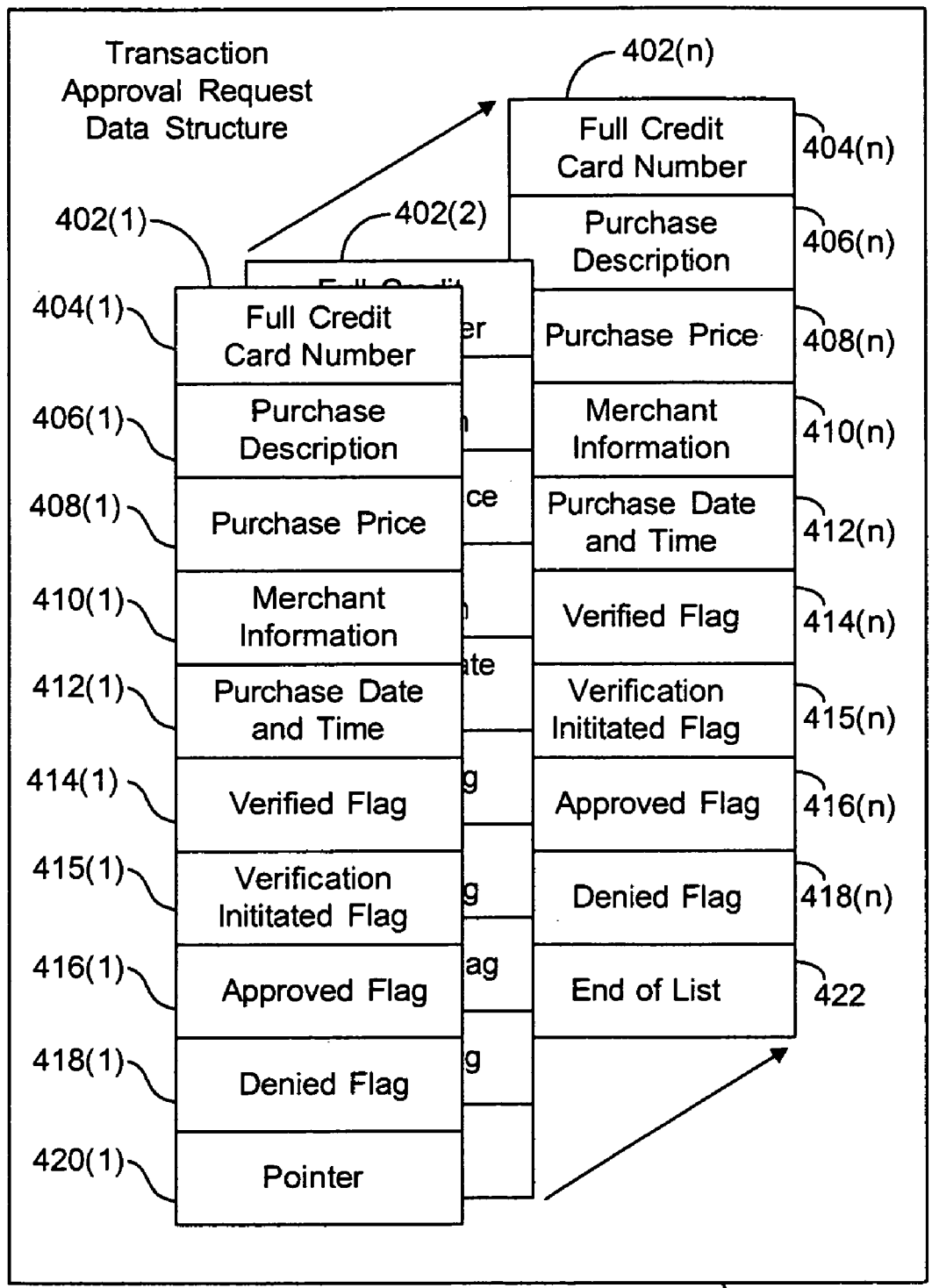
FIG. 4 is a block diagram showing exemplary data structures for storing transaction approval requests records in the Credit Approval Request Queue of FIG. 2.

FIG. 4 shows an example of a credit approval request data structure 400 suitable for use with a particular embodiment of the present invention. Those skilled in the art will recognize data structure 400 as a linked-list of records 402(1-n). Each of records 402(1-n) represents a pending TAR and includes a full credit card number 404, a purchase description 406, a purchase price 408, merchant information 410, purchase date and time information 412; a verified flag 414, a verification initiated flag 415, an approved flag 416, a denied flag 418, and a pointer 420. Full credit card number 404, purchase description 406, purchase price 408, merchant information 410, and purchase date and time information 412 are received by server 200 from merchant 104 with the TAR. Verified flag 414, approved flag 416, and denied flag 418 are used to indicate the status of each record 402 in the authorization process, as will be explained in greater detail below. Pointer 420 indicates the memory address of the next record 402(+1) in the list. The last record 402(n) includes an end of list value 422, that indicates that record 402(n) is the last record in the list.

Verified flag 414, verification initiated flag 415, approved flag 416, and denied flag 418 are single bit flags indicating the status of the respective record. Verified flag 414 indicates if the associated TAR has been verified (e.g. verified flag 414=1) or if the TAR is not verified (e.g. verified flag 414=0). Verification initiated flag 415 indicates whether server 200 has initiated the verification process with card-holder 102. Approved flag 416 indicates whether or not the associated TAR has been approved (e.g. approved flag=1). Denied flag 418 indicates whether the associated TAR has been denied (e.g. denied flag=1).

Figure 5:
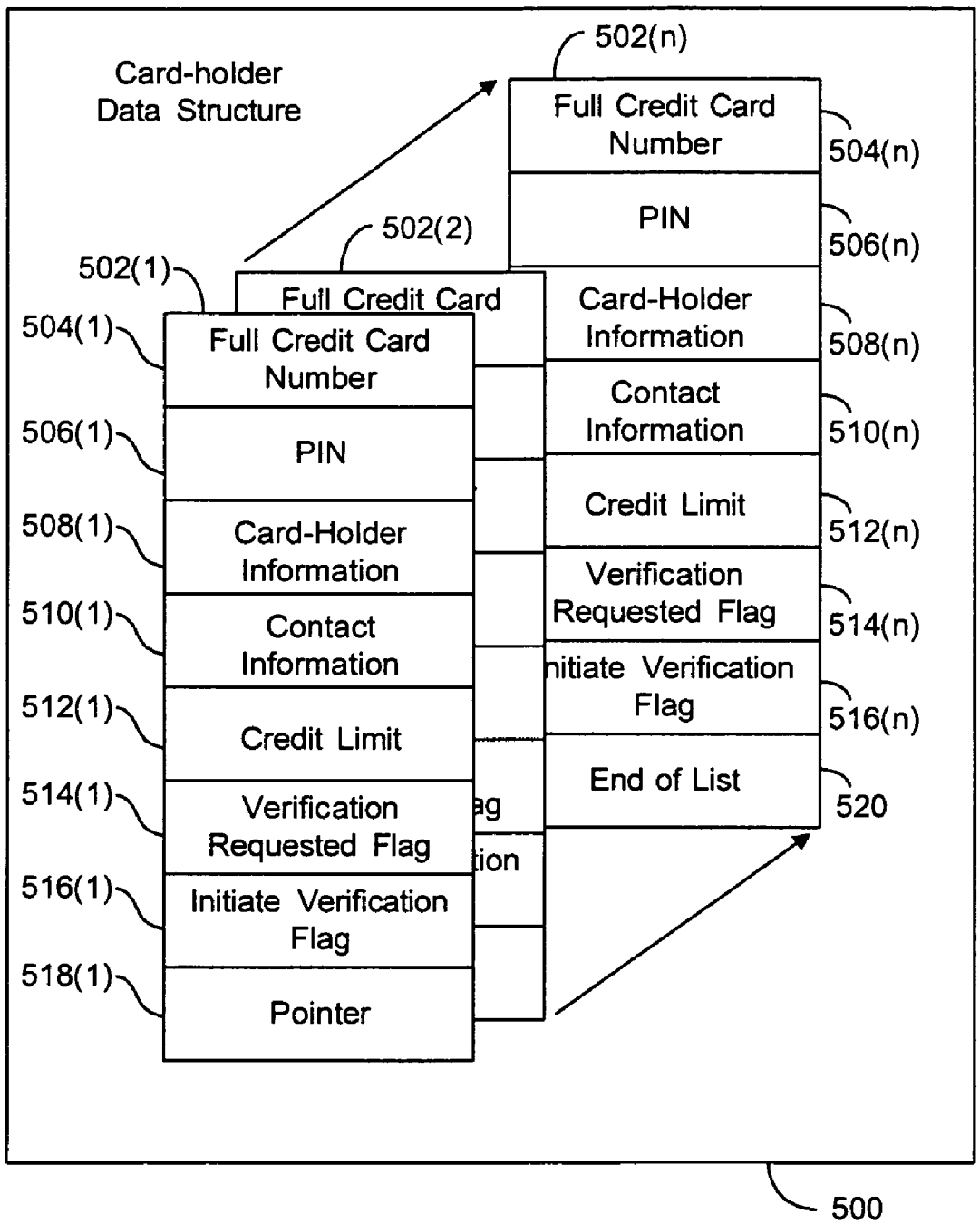
FIG. 5 is a block diagram showing exemplary data structures for storing card-holder data in the Card-holder List module of FIG. 2.

FIG. 5 shows an example of a card-holder data structure 500 suitable for storing card-holder data in card-holder list module 222. Those skilled in the art will recognize that data structure 500 is a linked list of records 502(1-n), with one record 502 for each valid credit account extended by credit card company 106. Each record 502 includes a full credit card number 504 issued to an associated card-holder, a personal identification number (PIN) 506, card-holder information 508, contact information 510, a credit limit 512, a verification requested flag 514, an initiate verification flag 516, and a pointer 518.

PIN 506 is a code used to authenticate card-holder 102 during the verification process or to allow card-holder 102 to set preference settings (e.g., verification requested flag 514, initiate verification flag 516, etc.). Card-holder information 508 includes, but is not limited to, such personal information as card-holder's first and last names, date of birth, social security number, and/or address. Contact information 510 comprises information necessary for communications with the associated card-holder, especially for TAR verification. Contact information 510 may include, but is not limited to, a telephone number, a pager number, or an e-mail address. Credit limit 512 indicates the prearranged credit limit for the associated card-holder. Verification requested flag 514 allows card-holder 102 to selectively disable the verification process by for example, automatically verifying subsequent TARs without further input from card-holder 102. In this embodiment, verification requested flag 514 is a single bit flag, wherein a value of 1 indicates that the verification process should be carried out, and a value of 0 indicates that the card-holder wishes to suspend the verification process. Single bit initiate verification flag 516 indicates whether card-holder 102 wishes server 200 to initiate the verification process, or if server 200 should wait for user 102 to initiate the verification process. If initiate verification flag 516 has a value of 1, interactive verification module 306 initiates the verification process with the associated card-holder (e.g. e-mail, automated telephone call, etc.). If initiate verification flag 516 has a value of 0, the associated card-holder must initiate verification (e.g., place telephone call to server 200, log onto server 200 via internetwork 110, etc.). Pointer 518 indicates the start address of the next record 502 in card-holder data structure 500. End of list indicator 520 indicates that record 502(n) is last record in card-holder data structure 500.

Figure 6:
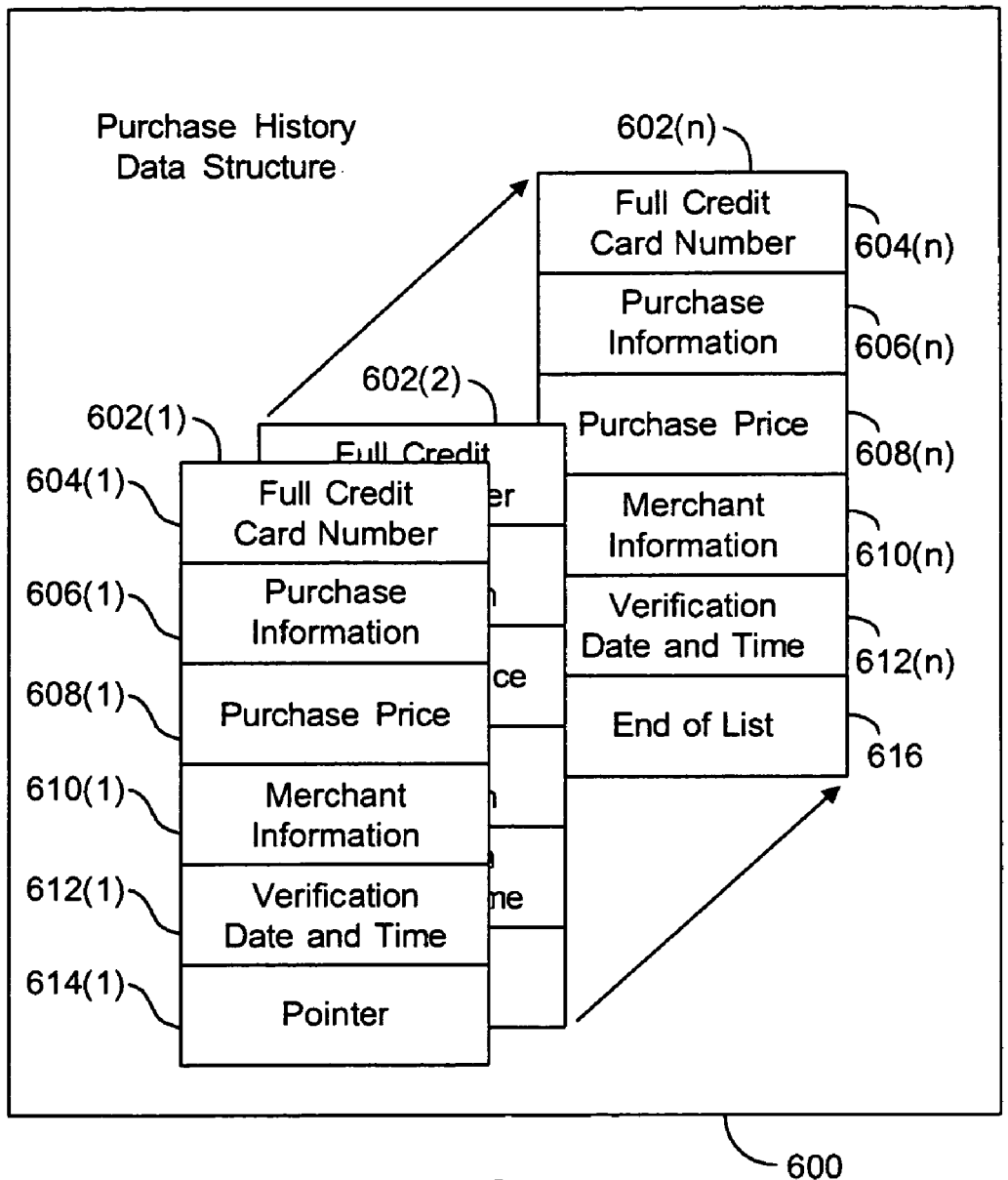
FIG. 6 is a block diagram showing exemplary data structures for storing transaction records in the Purchase History module of FIG. 2.

FIG. 6 shows an example of a purchase history data structure 606, suitable for use with a particular embodiment of the present invention. Purchase history data structure 600 is a linked-list of records 602(1-n), each of which includes a full credit card number 604, purchase information 606, a purchase price 608, merchant information 610, a verification date and time 612, and a pointer 614. Credit card number 604 identifies the particular transaction with the associated card-holder. Purchase information 606 includes information (e.g., product description) that will help identify the transaction to the card-holder. Purchase price 608 indicates the cost associated with the purchase. Merchant information 610 identifies the merchant that submitted the TAR. Verification date and time 612 indicates when, if at all, the associated card-holder verified the TAR. Pointer 614 indicates the address of the next record. 602 in data structure 600. End of list indicator 616(n) indicates that record 602(n) is the last record in purchase history data structure 600.

Those skilled in the art will understand that the above-described credit approval request data structure 400, card-holder data structure 500, and purchase history data structure 600 are exemplary in nature, and that other data structures may, and likely will, be employed with the present invention. Accordingly, the particular data structures described herein by way of example are not considered to be essential elements of the present invention.

The operation of a particular embodiment of the present invention will now be explained with reference to FIGS. 1-6. The process begins when card-holder 102 submits an order for goods or services to merchant 104, and uses a credit card number assigned by credit card company 106 as the means of payment. Merchant 104 then transmits a transaction approval request to credit card company 106 including the credit card number supplied by card-holder 102, a description of the purchase, the purchase price, the purchase date and time, and information identifying merchant 104.

Merchant communications module 232 (FIG. 2) periodically polls network interface 204 and telecommunications device 214 for any incoming TARs from merchant 104. When a TAR is received, merchant communications module 232 scans card-holder list 222 to determine whether there is a record 502 (FIG. 5) with a credit card number 504 matching the credit card number provided with the TAR. If there is no such record in card-holder list 222, then merchant communications module 232 transmits a denial to merchant 104.

If, however, the submitted credit card number matches a credit card number 502(x) in card-holder list 222, then merchant communications module 232 generates a credit approval request record 402 using the information provided in the TAR to create fields 404, 406, 408, 410, and 412, and stores the new record in CARQ 220. Initially, verified flag 414, approved flag 416, and denied flag 418 are all set equal to zero.

Master verification module 304 of authorization module 226 periodically scans CARQ 220 for pending TARs. Any pending TARs are processed based on the status of flags 414, 416, and 418. For example, if approved flag 416(1) of the first TAR record 402(1) is set equal to zero, then master verification module 304 calls credit approval module 302 to perform the conventional credit approval of TAR 402(1).

Credit approval module 302 performs the conventional credit approval process by means well know to those skilled in the art. Conventional credit approval typically comprises, but is not restricted to, credit approval module 302 comparing purchase price 408(1) and the associated card-holder's 102(x) existing balance to card-holder's 102(x) credit limit 512(x). If the sum of purchase price 408(1) and card-holder's 102(x) existing balance is less than or equal to credit limit 512(x), then credit approval module 302 sets approved flag 416(1) equal to 1. If there are any outstanding discrepancies in the account (e.g., overdue payments), or if the sum of purchase price 408(1) and card-holder's 102(x) existing balance is greater than credit limit 512(x), then credit approval module 302 sets denied flag 418(1) equal to 1.

During the next scan of CARQ 220 master verification module 304 again checks flags 414(1), 416(1), and 418(1) to determine the appropriate action. Note that verified flag 414(1) should still be equal to 0, because the TAR record 402(1) has not yet been processed for verification. If denied flag 418(1) is set equal to 1, then master verification module 304 calls merchant response module 308 to transmit a denial to merchant 104, removes record 402(1) from CARQ 220, and writes a record 602 of the denied transaction in purchase history module 230. If approved flag 416(1) is set equal to 1, then master authorization module 304 retrieves verification requested flag 514(x) to determine whether card-holder 102(x) has selectively disabled the verification process. If verification requested flag 514(x) is set equal to 0, then master verification module 304 automatically sets verified flag 416(1) equal to 1, and leaves TAR record 402(1) in CARQ 220. If verification requested flag 514(x) is equal to 0, then master authorization module 304 transfers TAR record 402(1) to VPQ 228 to await verification by card-holder 102(x).

Master verification module 304 also scans VPQ 228 periodically (e.g., after each scan of CARQ 220) to process any pending TAR records 402 in VPQ 228 for verification. If verified flag 414 of a particular record 402 is set equal to 1, it indicates that the TAR corresponding to record 402 has been verified by card-holder 102(x). The first time TAR record 402(1) is scanned in VPQ 228, verified flag 414(1) and verification initiated flag 415(1) should both be set equal to 0. Master verification module 304 then retrieves record 502(x) from card-holder list 222 to determine whether server 200 should initiate the verification process (e.g., send an e-mail to user 102(x), page user 102(x), place a call to user 102(x), etc.), or whether server 200 should wait for user 102(x) to initiate the verification process. If initiate verification flag 516(x) is set equal to 0, then master verification module sets verification initiated flag 415(1) equal to 1. Setting the verification initiated flag equal to 1, even though server 200 has not initiated the verification process, eliminates the need to check verification requested flag 516(x) each time VPQ 228 is scanned by master verification module 304.

If, during the first scan of record 402(1) in VPQ 228, master verification module 304 determines that initiate verification flag 516(x) had been set equal to 1, then master verification module 304 calls interactive verification module 306 to initiate the verification process with card-holder 102(x). Interactive verification module 306 then initiates the verification process, sets verification initiated flag 415(1) equal to 1, and returns control to master verification module 304, which retrieves the next record 402 in VPQ 228 for processing.

Master verification module 304 also periodically calls interactive verification module 306 to conduct the actual verification of TARs pending in VPQ 228. Verification of pending TARs is accomplished by establishing a connection with card-holder 102(x) separate from the connection with merchant 104 over which the TAR was originally received, providing additional security compared to prior art electronic transactions such as ATM card purchases. As used herein, the phrase "establishing a connection" is understood to be interpreted in its broadest possible sense to include, but not be limited to, establishing a network connection, establishing a data connection over a modem, establishing a voice connection over a telecommunications device, sending or receiving e-mail, etc. Thus, card-holder 102 could verify pending transaction approval requests by logging onto server 200 via internetwork 110, making a direct modem connection with server 200 via network 114, dialing into server 200 via a telephone, sending an e-mail to server 200, responding to an e-mail from server 200, or any other form of electronic communication.

In an alternate embodiment, system 200 can be modified to allow account-holder 102 to pre-approve certain charges. For example, card-holder list 222 could include a field for pre-approved merchants (or any other desirable criteria). Then, when a transaction approval request is processed, authorization module 226 can compare the merchant identification to the associated card-holder's pre-approved merchant's list, and, if the merchant appears on the list, automatically verify the TAR. Card-holder 102 could access system 200 to modify such pre-approved lists via internetwork 110, network 114, or any other means known for updating customer data.

In the particular embodiment of the present invention shown in FIGS. 1-3, interactive verification module 306 communicates with card-holders 102 via card-holder communications module 224 and network interface 204 and telecommunications device 214. Card-holder communications module 224 periodically polls network interface 204 and telecommunications device 214 for incoming connection requests (e.g., e-mail, network connection, phone call, etc.) and establishes any such connections. Such communications programs (e.g., e-mail software, network protocols, etc.) are well known to those skilled in the art, and are not therefore described in detail so as not to unnecessarily obscure the present invention.

Interactive verification module 306 polls card-holder communications module 224 to determine whether there are any established connections with card-holders 102, and processes each established connection. Assuming card-holder 102(x) has established a connection with server 200, the verification of pending TARs proceeds as follows. The connection request should identify card-holder 102(x) (e.g., by credit card number), and optionally includes an authentication code (e.g., a personal identification number (PIN)) to authenticate card-holder 102(x). Interactive verification module 306 uses the identification information in the connection request to retrieve record 502(x) corresponding to card-holder 102(x) from card-holder list 222. Then, interactive verification module 306 compares the PIN provided in the connection request with PIN 506(x) to authenticate the card-holder. If the PINs do not match, the connection is terminated. If the PINs match, the verification process proceeds.

Those skilled in the art will understand that the connection with card-holder 102(x) need not be terminated the first time an incorrect PIN is received. For example, conventional network security systems typically allow a predetermined number of incorrect entries prior to disconnecting a user. Alternatively, security measures such as stalling the user attempting to access the system, while a trace of the connection is initiated, can be employed.

Next, interactive verification module 306 scans verification pending queue 228 for all TARs with a credit card number 402 matching credit card number 504(x) of card-holder 102(x). Each matching TAR is then presented to card-holder 102(x) to be verified disclaimed. If card-holder 102(x) verifies a particular transaction, then interactive verification module 306 sets the verified flag 414 of that TAR record to equal 1. If card-holder 102(x) disclaims the transaction (e.g., because the purchase was unauthorized), then interactive verification module 306 sets the denied flag 418 of the TAR record to equal 1.

There are many possible ways to present pending TARs to card-holder 102(x) and to receive verification instructions from card-holder 102(x), depending on the type of connection established with server 200. For example, if card-holder 102 establishes an HTTP connection with server 200, then pending TARs could be presented in the form of an Internet web page. Alternatively, if the connection between card-holder 102(x) and server 200 is a telephone voice connection, then pending TARs can be presented to card-holder 102(x) via an automated text to speech system, such as are well known in the art. Card-holder 102(x) could then transmit verification instructions via voice or keypad commands (e.g. touching button 1 to verify; or touching button 2 to disclaim). As yet another example, in the case where the connection request is in the form of an e-mail response, the e-mail response can include verification instructions (e.g., in the subject line of the e-mail) that can be automatically processed by interactive verification module 306. While using any of the above-described types of connections to verify TARs is considered to be a novel aspect of the present invention, no particular type of connection is considered to be an essential element of the present invention.

After interactive verification module 306 has processed any connection requests, control is returned to master verification module 304, which scans VPQ 228 and transfers any TAR records whose verified flag 414 or denied flag 418 has been set equal to 1. Additionally, master verification module 304 scans all records 402 remaining in VPQ 228, and compares the value in the purchase date and time field 412 with the date and time provided by system clock 212. If the resulting time difference exceeds a predetermined time interval (e.g., 24 hours), then master verification module 304 sets the denied flag 418 of the associated record 402 equal to 1 and transfers the record 402 to CARQ 220.

During the next scan of CARQ 220, master verification module 304 will locate any TAR records that have both verified flag 414 and approved flag 416 set equal to 1, call merchant response module to transmit an approval to the merchant identified in field 410 of the record, remove the record from CARQ 220, and write a record 602 into purchase history data 230 to document the completed transaction. Records whose denied flags 418 are found to be set equal to 1 are handled similarly, except that a denial is transmitted to the identified merchant instead of an approval.

Figure 7:
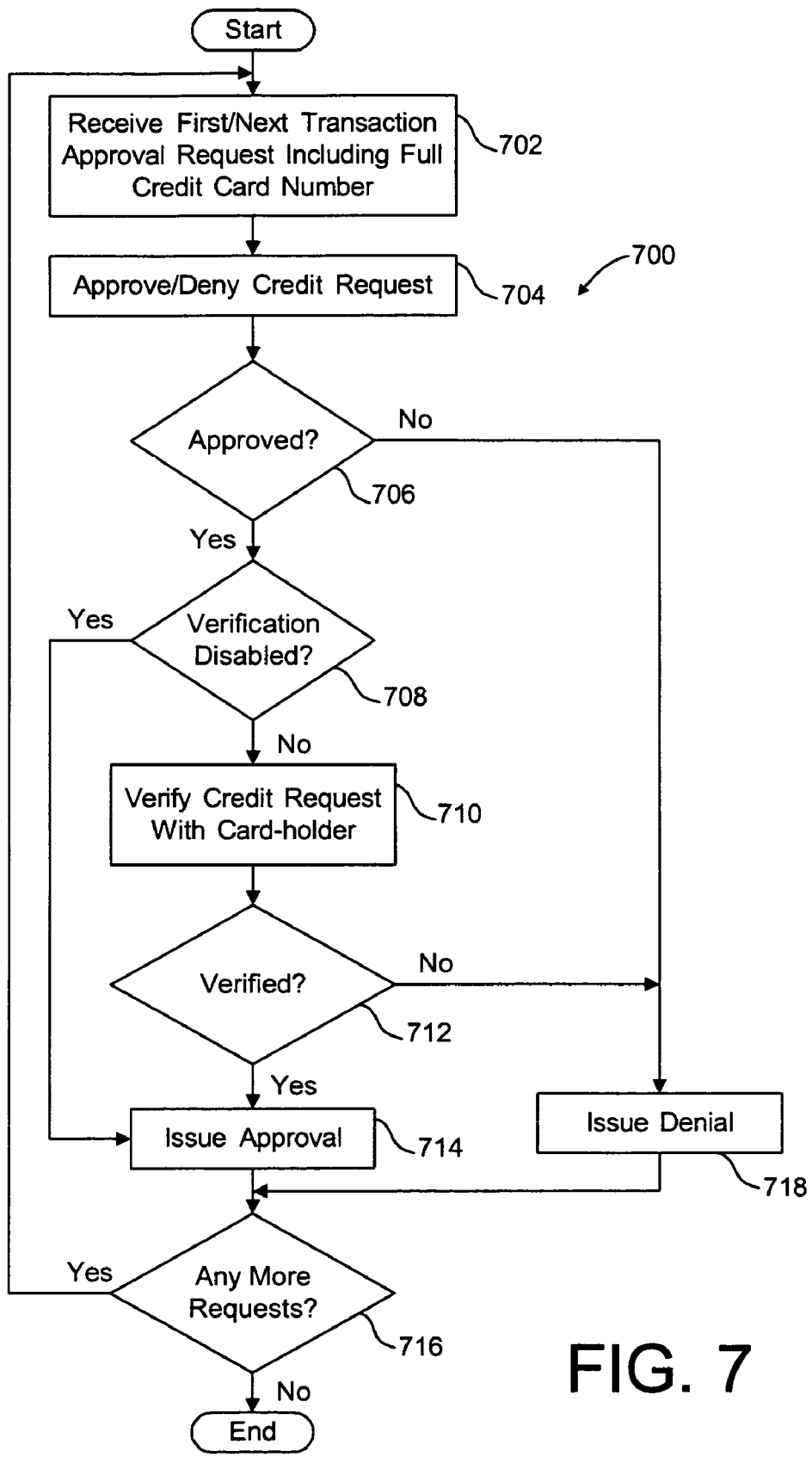
FIG. 7 is a flowchart summarizing one method of providing safe and secure electronic transactions according to the present invention.

FIG. 7 is a flowchart summarizing a method 700 of processing a TAR in accordance with the present invention. In a first step 702 merchant communications module 232 receives a TAR including a full credit card number from a merchant 104, generates a TAR record 402, and writes TAR record 402 into CARQ 220. In a second step 704 authorization module 226 subjects TAR record 402 to a conventional credit approval process, and sets approved flag 416 or denied flag 418 to indicate whether the requested credit is approved or denied. In a third step 706, authorization module 226 determines from flags 416 and 418 whether the requested credit has been approved or denied. If in third step 706, authorization module 226 determines that the requested credit has been approved, then in a fourth step 708 authorization module 226 determines whether card-holder 102 has selectively disabled the verification process. If the verification process has not been selectively disabled, then in a fifth step 710 authorization module 226 verifies the transaction with card-holder 102. Then, in a sixth step 712 authorization module 226 determines whether the TAR has been verified by card-holder 102. If the TAR has been verified, then in a seventh step 714 merchant communications module 232 transmits a transaction approval to merchant 104. Next, in an eighth step 716, authorization module 226 determines whether there are any more TAR records in CARQ 220. If there are no more records in CARQ 220, then method 700 ends.

If in third step 706 authorization module 226 determines that the credit request has been denied, then method 700 proceeds to a ninth step 718 where merchant communications module 232 transmits a denial to merchant 104. If in fourth step 708, authorization module 226 determines that the verification process has been selectively disabled, then method 700 proceeds to seventh step 714 where merchant communications module 232 transmits an approval to merchant 104. If in sixth step 712, authorization module 226 determines that the TAR has not been verified by card-holder 102, then method 700 proceeds to ninth step 718 where merchant communications module 232 transmits a denial to merchant 104. Finally, if in eighth step 716, authorization module 226 determines that there are more pending TAR records in CARQ 220, then method 700 returns to first step 702 to process the next record in CARQ 220.

Figure 8:
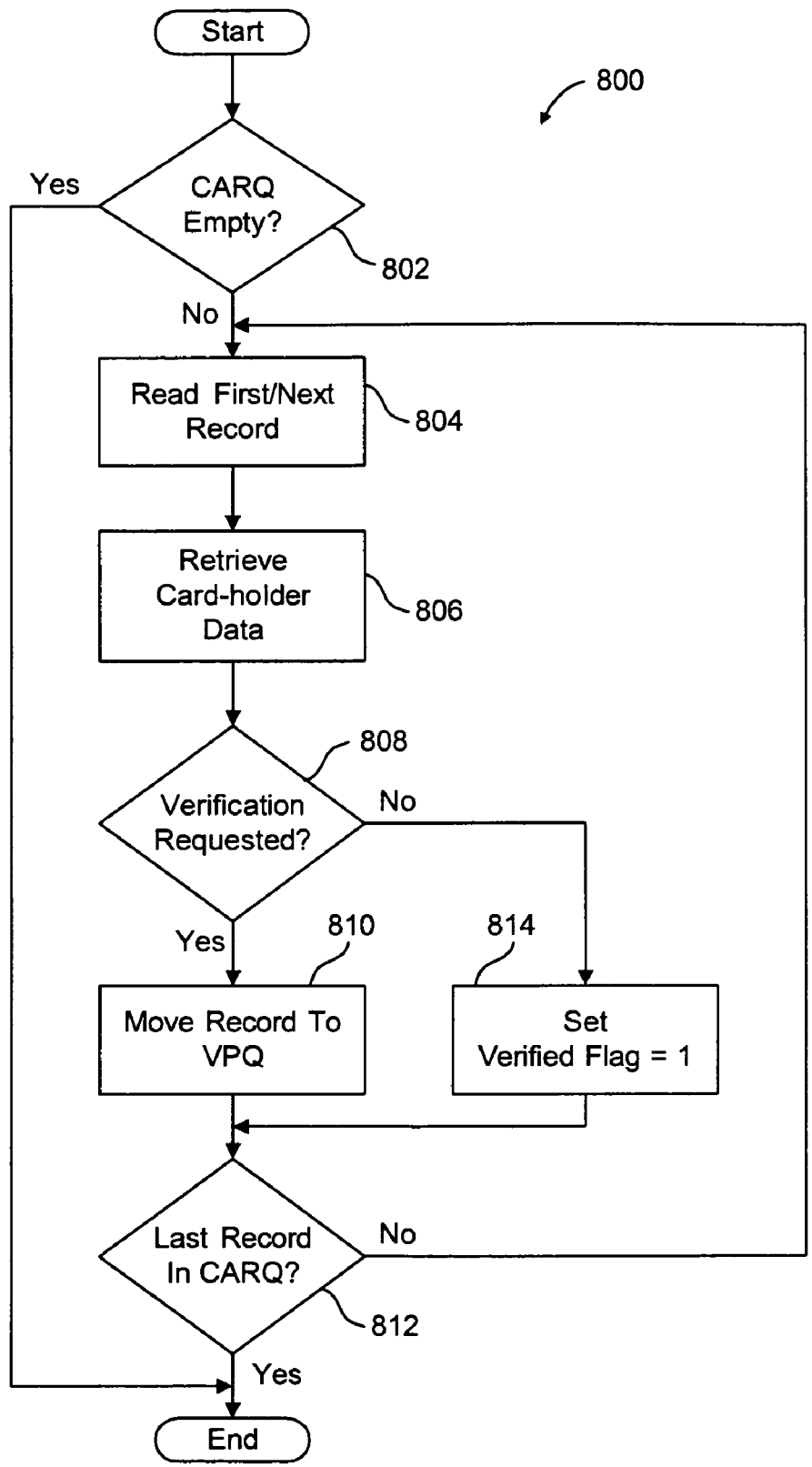
FIG. 8 is a flowchart summarizing one method of performing the fourth step (verification disabled?) of the method of FIG. 7.

FIG. 8 is a flowchart summarizing a method 800 for implementing the selective disabling of the TAR verification process according to a particular embodiment of the present invention.

In a first step 802, authorization module 226 determines if CARQ 220 is empty. If CARQ 220 is not empty, then in a second step 804 authorization module 226 reads the first TAR record in CARQ 220. Then, in a third step 806, authorization module 226 associates the first TAR with a card-holder 102 and retrieves a card-holder record 502 corresponding to the particular card-holder from card-holder list 222. In a fourth step 808, authorization module 226 determines from card-holder record 502 whether card-holder 102 has requested that TARs be verified with card-holder 102 prior to transmitting an approval to merchant 104. If it is determined that card-holder verification is requested (i.e., enabled), then in a fifth step 810 authorization module 226 transfers the associated TAR record to VPQ 228. Next, in a sixth step 812, authorization module 226 determines whether the last record in CARQ 220 has been processed, and if so then method 800 ends.

If, in fourth step 808, authorization module 226 determines that verification is not required (i.e., disabled), then in a seventh step 814 verified flag 414 is automatically set to 1 to indicate that the TAR has been verified. If in sixth step 812, authorization module 226 determines that the last record in CARQ 220 has not been processed, then method 800 returns to second step 804 to begin processing the next record in CARQ 220.

Figure 9:
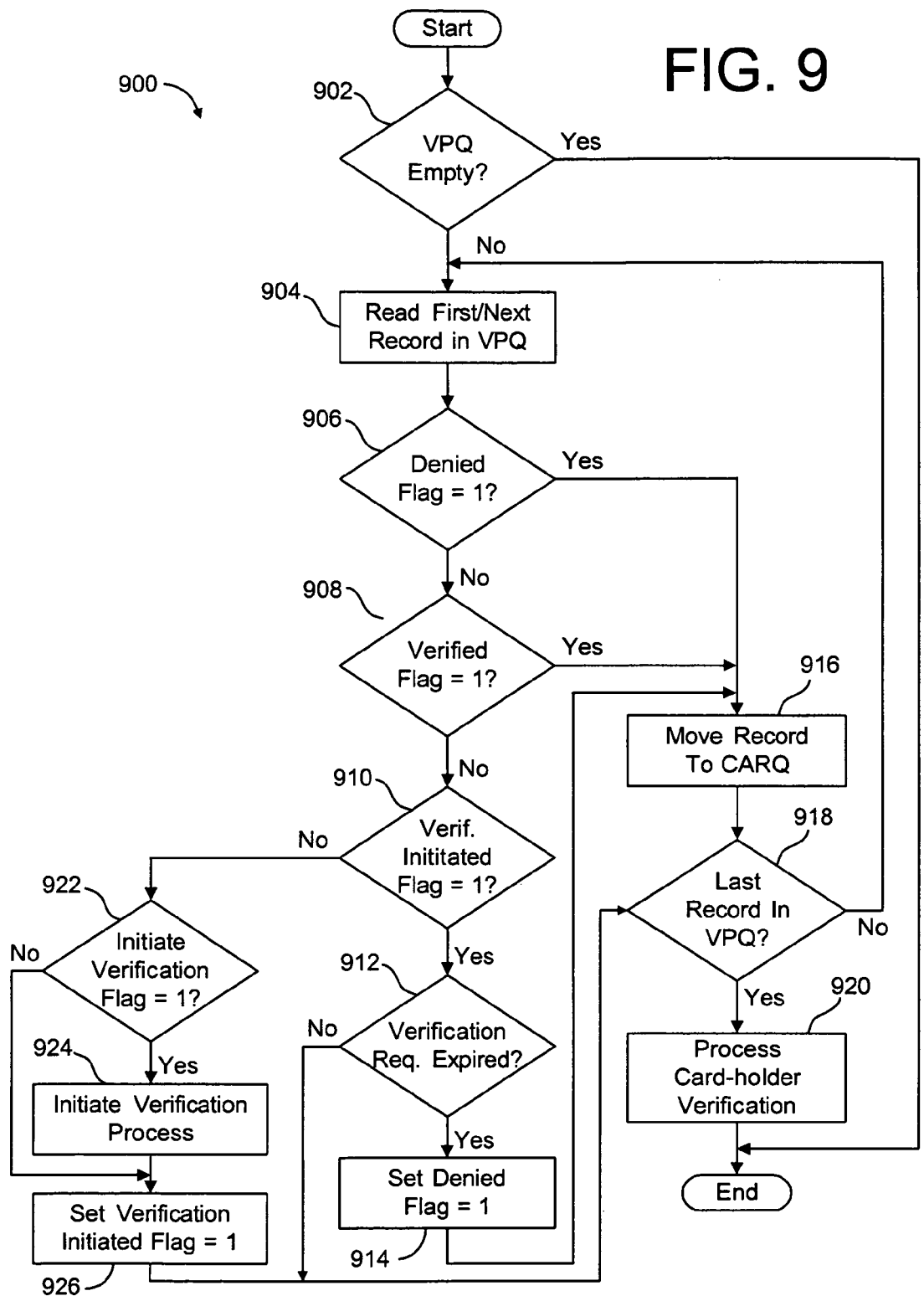
FIG. 9 is a flowchart summarizing one method of performing the fifth step (card-holder verification) of the method of FIG. 7.

FIG. 9 is a flowchart summarizing a particular method 900 for verifying a TAR in accordance with the present invention. In a first step 902 authorization module 226 determines whether VPQ 228 is empty. If VPQ 228 is not empty, then in a second step 904 authorization module 226 reads the first TAR record 402 in VPQ 228. In a third step 906 authorization module 226 determines whether TAR record 402 has been previously denied (e.g., denied flag 418=1). If TAR record 402 has not been previously denied, then in a fourth step 908 authorization module 226 determines if the current TAR has been previously verified (e.g. verified flag 414=1). If the TAR has not yet been verified, then in a fifth step 910 authorization module 226 determines whether the verification process has already been initiated by server 200 (e.g., verification initiated flag 415=1). If the verification initiated flag 415 is equal to 1, then in a sixth step 912 authorization module 226 determines if there has been a lapse of a predetermined time period since the current TAR was received by server 200 (e.g. read purchase date and time 412 and compare to system clock 212). If the predetermined time period has lapsed, then in a seventh step 914 authorization module 226 automatically disclaims the TAR (e.g. sets denied flag=1), and, in an eighth step 916, transfers the TAR record to CARQ 220. In a ninth step 918 authorization module 226 determines if the last record in VPQ 228 has been processed. If all the records in VPQ have been processed, then in a tenth step 920 authorization module 226 performs the card-holder verification process for any TAR records remaining in VPQ 228.

If, in first step 902, authorization module 226 determines that VPQ 228 is empty, then method 900 ends. If, in third step 906, authorization module 226 determines that the TAR record being processed has been denied, then method 900 proceeds directly to eighth step 916. Similarly, if in fourth step 908 authorization module 226 determines that the TAR record being processed has been previously verified, then method 900 proceeds to eighth step 916.

If in fifth step 910, authorization module 226 determines that verification initiated flag 415 is equal to 0, then method 900 proceeds to an eleventh step 922 where authorization module 226 further determines whether the verification process should be initiated by authorization module 226 (e.g. initiate verification flag 516=1). If, in eleventh step 922, authorization module 226 determines that it is to initiate the verification process with card-holder 102, then in a twelfth step 924 server 200 initiates the verification process with card-holder 102, and in a thirteenth step 926 sets the initiated verification flag equal to 1. Then, method 900 proceeds to eighth step 916. If, in eleventh step 922, authorization module 226 determines that the initiate verification flag 516 is set equal to 0, then method 900 proceeds directly to thirteenth step 926.

If in sixth step 912 authorization module 226 determines that the predetermined time interval has not lapsed, then method 900 proceeds to eighth step 916. If, in ninth step 918, authorization module 226 determines that there are additional TAR records in VPQ 228, then method 900 returns to second step 904 to process the next TAR record.

Figure 10:
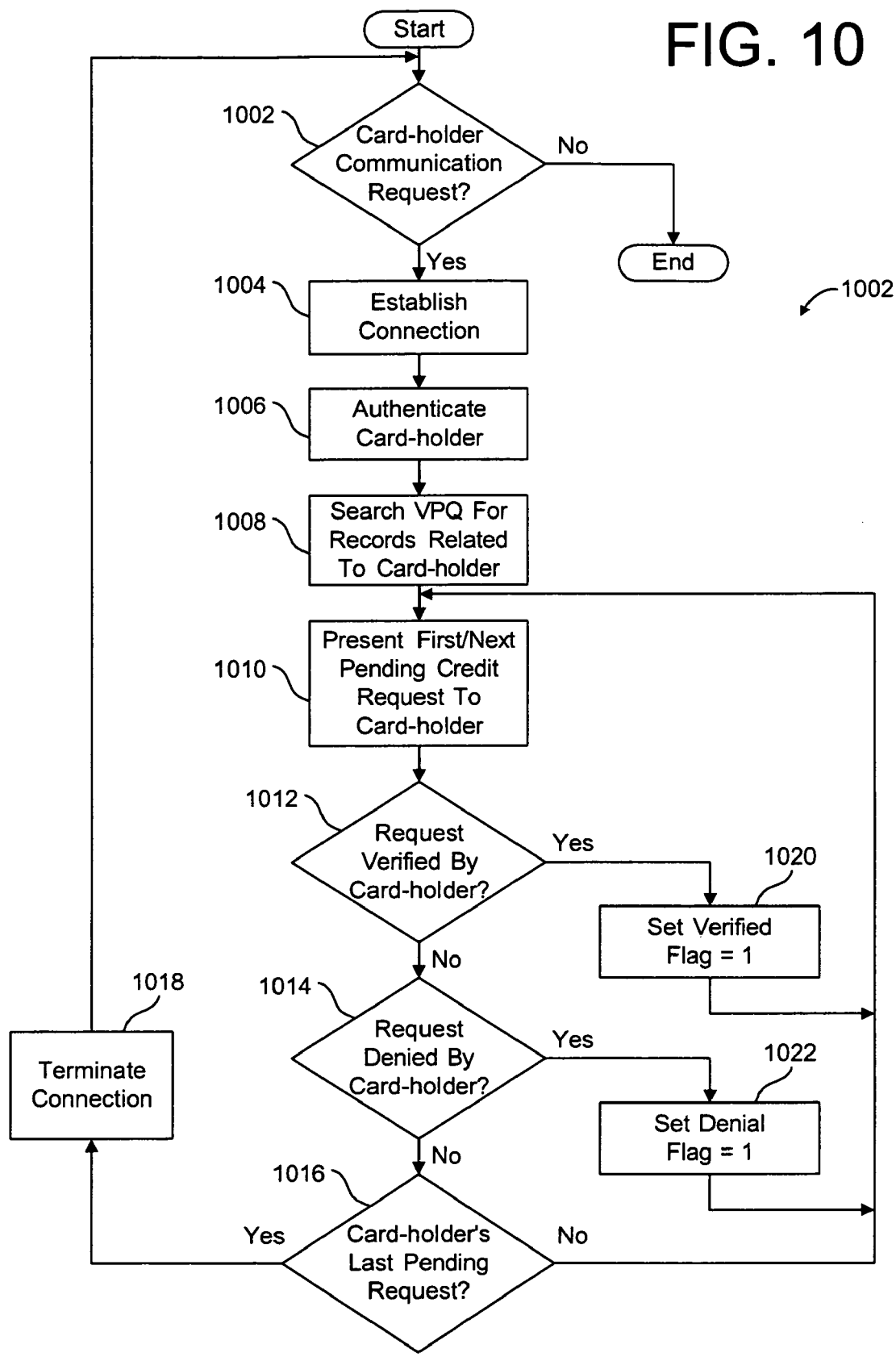
FIG. 10 is a flowchart summarizing an alternate method of performing the fifth step (card-holder verification) of the method of FIG. 7.

FIG. 10 is a flowchart summarizing a method 1000 of verifying pending TARs with card-holder 102. In a first step 1002, card-holder communications module 224 polls network interface 204 and telecommunications device 214 to determine whether there are any card-holder communication requests (e.g. a telephone call, network connection requests, etc.) from card-holder 102, and if so then in second step 1004, authorization module 226 calls interactive verification module 306 to establish a connection with card-holder 102. In a third step 1006, interactive verification module 306 authenticates card-holder 102 (e.g. requires an authentication code), and in a fourth step 1008 searches VPQ 228 for records related to card-holder 102. Then, in a fifth step 1010, interactive verification module 306 presents at least a portion of a pending TAR (sufficient for card-holder recognition) to card-holder 102. Next, in a sixth step 1012, interactive verification module polls the established connection to determine whether card-holder 102 has transmitted instructions to verify the presented TAR. If there are no instructions from card-holder 102 to verify the TAR, then in a seventh step 1014 interactive verification module 306 determines whether card-holder 102 has transmitted instructions to disclaim the TAR. If there are no instructions to disclaim the TAR, then in an eighth step 1016 interactive verification module 306 determines whether the last pending TAR associated with card-holder 102 has been processed. If the last pending TAR has been processed, then in a ninth step 1018 interactive verification module 306 terminates the established connection with card-holder 102, and method 1000 returns to step 1002 to determine whether there are any communication requests from other card-holders. If, in first step 1002, card-holder communications module 224 determines that there are no card-holder communication requests, then method 1000 ends.

If in sixth step 1012, interactive verification module 306 receives instructions from card-holder 102 to verify the presented TAR, then in a tenth step 1020 interactive verification module 306 sets verified flag 414 of the TAR record 402 to a value of 1, indicating the TAR has been verified. Then, method 1000 returns to fifth step 1010. Similarly, if in seventh step 1014, interactive verification module 306 receives instructions from card-holder 102 to disclaim the presented TAR, then in an eleventh step 1022 interactive verification module 306 sets denied flag 418 of the TAR record 402 to a value of 1, indicating the TAR has been disclaimed. Then, method 1000 returns to fifth step 1010.

If, in eighth step 1016, interactive verification module 306 determines that the last pending request for the particular card-holder has not been processed, then method 1000 returns to fifth step 1010 to process the next pending TAR for the particular card-holder.

Figure 11:
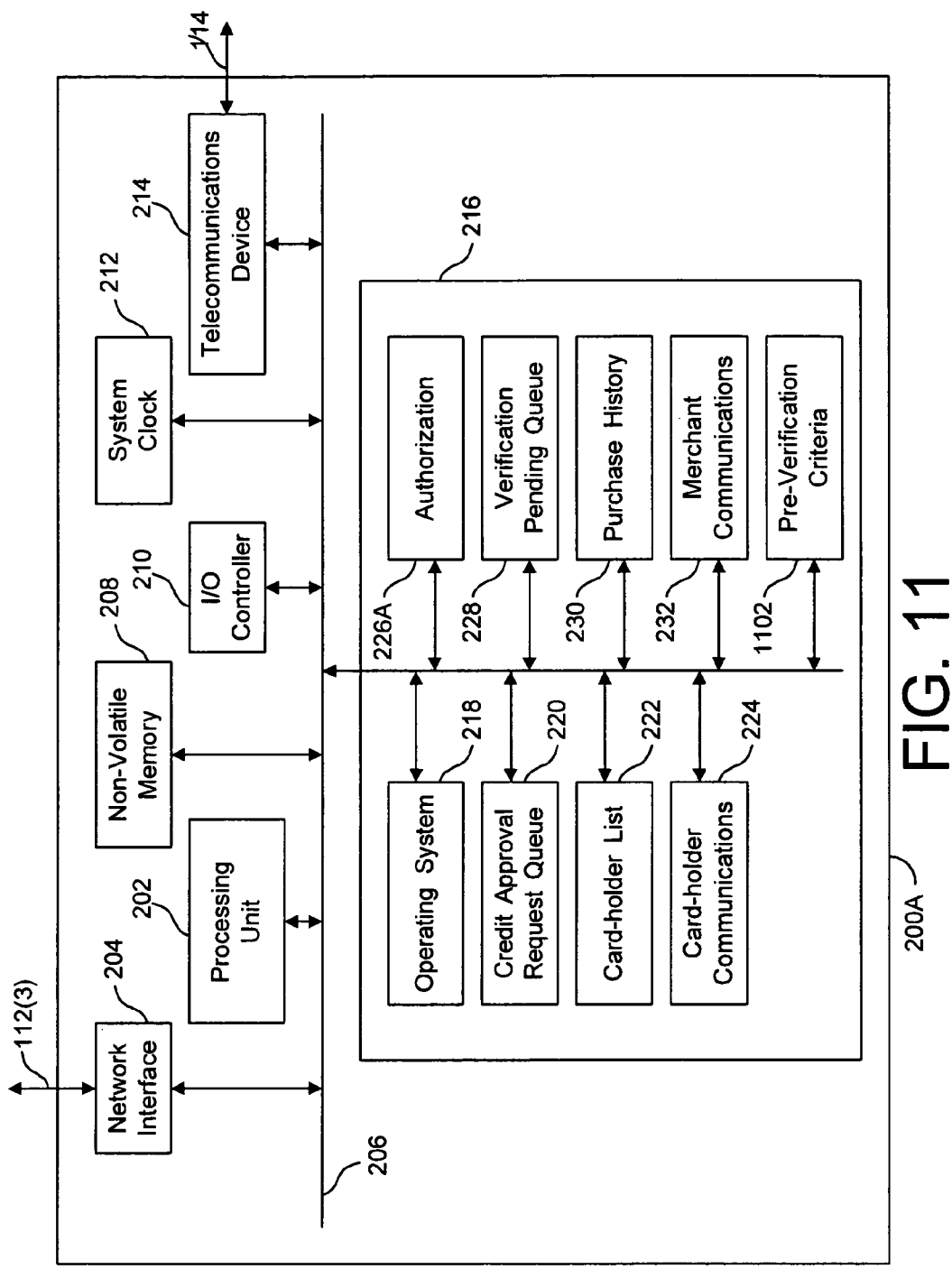
FIG. 11 is a block diagram showing an alternate server including pre-verification criteria and an alternate authorization module used to pre-verify transactions according to the present invention.

FIG. 11 is a block diagram of an alternate server 200A. Server 200A functions similar to server 200 of FIG. 2, except that server 200A includes pre-verification criteria (PVC) 1102 and an alternate authorization module 226A. Authorization module 226A controls and coordinates the approval and verification of TARs, and, in addition to the functions performed by authorization module 226, uses pre-verification criteria 1102 to automatically verify any TAR meeting the requirements of pre-verification criteria 1102. The use of pre-verification criteria 1102 facilitates accelerated verification of TARs, because authorization module 226A does not need to wait for direct verification by card-holder 102.

Pre-verification criteria 1102 is a database that includes individualized pre-verification criteria for each current customer of credit card company 106, including card-holder 102. Pre-verification criteria typically include, but are not limited to, merchant identifiers, a maximum purchase price, and specified dates between which purchases can be automatically verified by authorization module 226A. Those skilled in the art will understand that pre-verification criteria module 1102 would typically be a very large file. Therefore, while pre-verification criteria module 1102 is shown in memory 216, it should be understood that the entire customer files would likely be stored in a mass data storage system such as non-volatile memory 208, with portions of the entire list being swapped in and out of pre-verification criteria module 1102 as necessary.

Initially, pre-verification criteria are determined by credit card company 106 at the time the credit card account is opened, so that no purchases can be verified by the pre-verification criteria. In other words, the initial default value of the pre-verification criteria for each account is set such that no TAR could meet the pre-verification criteria (e.g., maximum purchase price=0). Alternately, the pre-verification criteria may be determined by card-holder 102 when the account is opened (e.g. on their credit card application). In either case, card-holder 102 can modify their pre-verification criteria over a secure network (e.g. via telephone or modem access), as will be described below.

Figure 12:
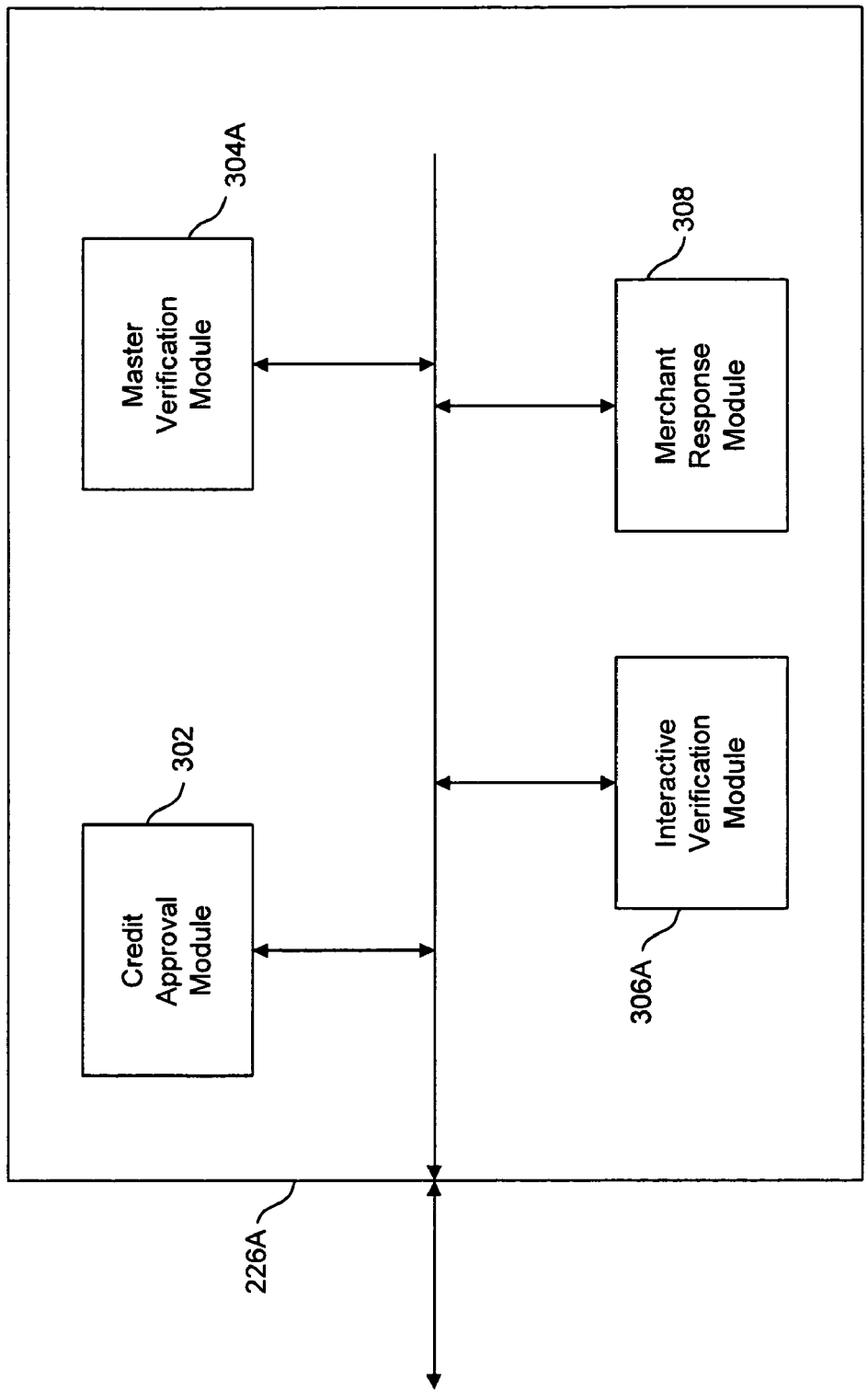
FIG. 12 is a block diagram detailing the alternate authorization module of FIG. 11.

FIG. 12 shows a block diagram of authorization module 226A to include a credit approval module 302, an alternate master verification module 304A, an interactive verification module 306, and a merchant response module 308. Credit approval module 302 executes conventional credit approval for each TAR contained in CARQ 220 by means well known to those skilled in the art. Master verification module 304A coordinates the authorization and verification processes, including verification using pre-verification criteria, and is responsible for overall control of authorization module 226A. Interactive verification module 306A carries out verification with card-holder 102, and coordinates modification of pre-verification criteria by card-holder 102. Merchant response module 308 initiates final communication with merchant 104 by transmitting either a transaction approval or a transaction denial.

Figure 13:
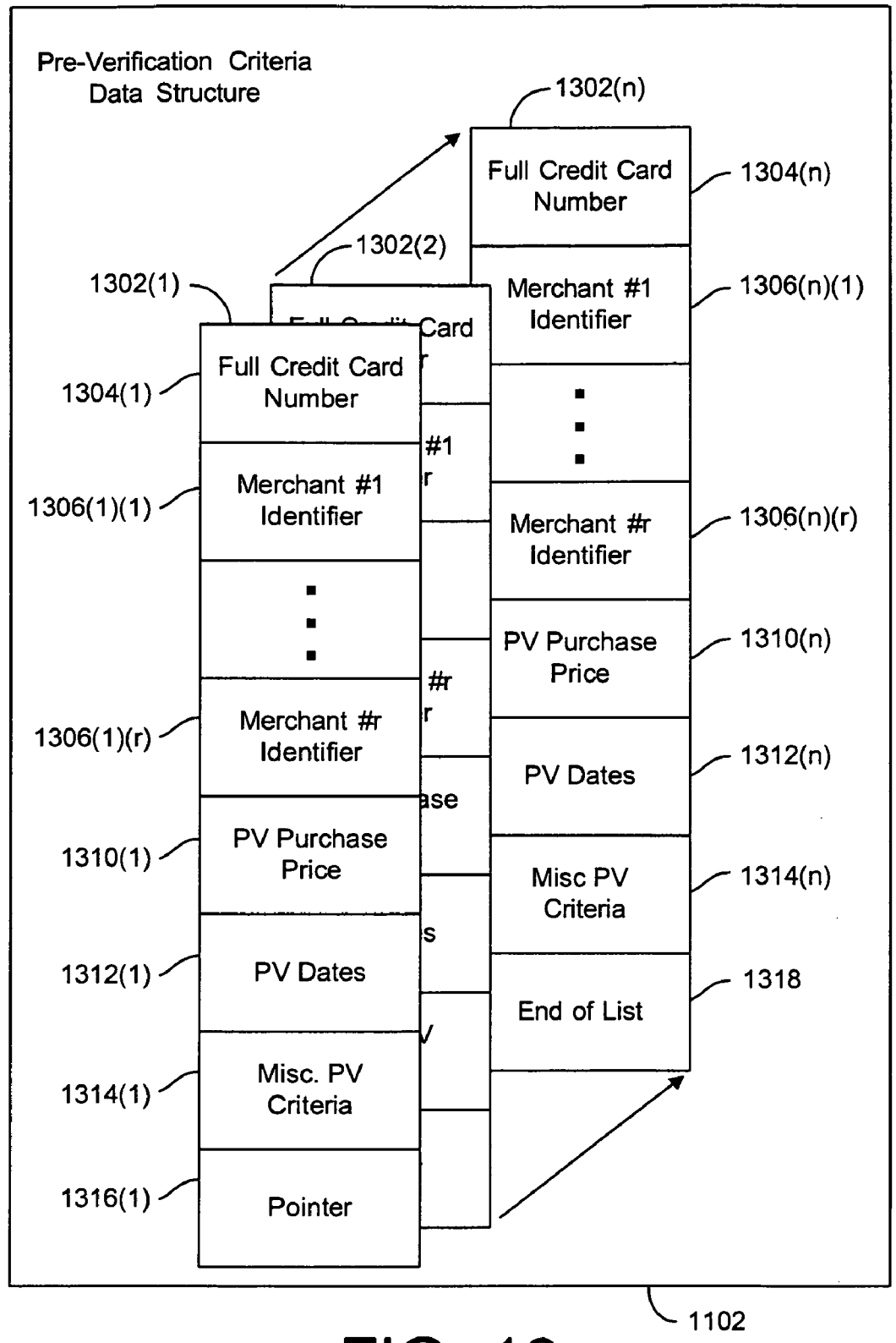
FIG. 13 is a block diagram showing exemplary data structures for storing the pre-verification criteria of FIG. 11.

FIG. 13 shows an example of a pre-verification criteria data structure 1300 suitable for use with a particular embodiment of the present invention. Those skilled in the art will recognize data structure 1300 as a linked-list of records 1302(1-$n$). Each record 1302(1-$n$) represents pre-verification criteria associated with a particular card-holder, and includes a full credit card number 1304, a first merchant identifier 1306(1), an rth merchant identifier 1306($r$), a maximum pre-verified purchase price 1310, a pair of pre-verification dates 1312, miscellaneous pre-verification criteria 1314, and a pointer 1316. Full credit card number 1304 associates a pre-verification criteria record 1302($a$) with a specific card-holder 102($a$). Merchant identifiers 1306(1-$r$) each contain information similar to merchant information 410 contained in each TAR. Merchant identifiers 1306(1-$r$) each identify a certain pre-verified merchants for each card-holder. TARs received from pre-verified merchants are automatically verified by authorization module 226A. Pre-verified purchase price 1310 sets a maximum purchase price for automatic verification. Any TAR including a purchase price 408 that is lower than pre-verified purchase price 1310 is automatically verified by authorization module 226A. Pre-verification dates 1312 include a begin date and an end date. Any TAR including a purchase date 412 that falls between the begin date and end date of pre-verification dates 1314 is automatically verified by authorization module 226A. Miscellaneous pre-verification criteria 1314 are included to illustrate that particular criteria other than those specifically listed above can be used to cause authorization module 226A to verify a TAR. For example, card-holder 102 may want to specify particular hours of the day when purchases should be automatically verified. For such a case, miscellaneous pre-verification criteria 1314 would include a start time and a stop time. Pointer 1316(*a*) indicates the memory address of the next record 1316(a+1) in the list. The last record 1302(*n*) includes an end of list value 1318 that indicates that record 1302(*n*) is the last record in the list.

Figure 14:
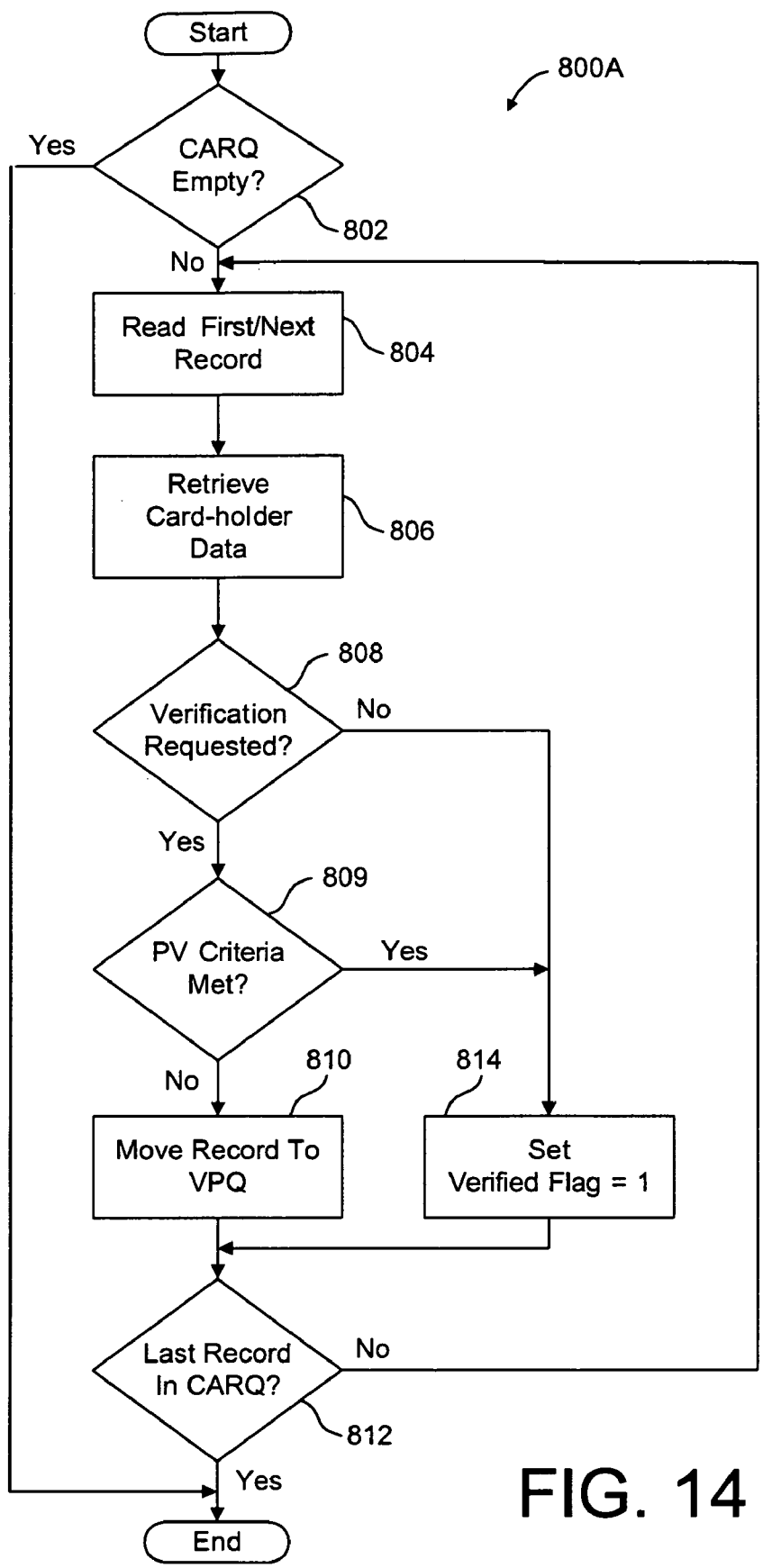
FIG. 14 is a flowchart summarizing another method of providing safe and secure electronic transactions according to the present invention.

FIG. 14 is a flowchart summarizing one method 800A for implementing the automatic verification of a TAR using pre-verification criteria according to a particular embodiment of the present invention. In a first step 802, authorization module 226A determines if CARQ 220 is empty. If CARQ is empty, then method 800A ends. If CARQ 220 is not empty, then in a second step 804, authorization module 226A reads the first TAR record in CARQ 220. Then, in a third step 806, authorization module 226A associates the first TAR with a card-holder 102 and retrieves a card-holder record 502 corresponding to the particular card-holder from card-holder list 222. In a fourth step 808, authorization module 226A determines from card-holder record 502 whether card-holder 102 has requested that TARs be verified with card-holder 102 prior to transmitting an approval to merchant 104. If it is determined that card-holder verification is requested (i.e., enabled), then in a fifth step 809 authorization module 226A determines if the pre-verification criteria associated with card-holder 102 have been satisfied. If in fifth step 809 the pre-verification requirements are not satisfied, then in a sixth step 810 authorization module 226A transfers the associated TAR record to VPQ 228. Next, in a seventh step 812, authorization module 226A determines whether the last record in CARQ 220 has been processed, and if so then method 800A ends.

If, in fourth step 808, authorization module 226A determines that verification is not required (i.e., disabled), then method 800A proceeds to an eighth step 814 where authorization module 226A sets verified flag 414 to 1 to indicate that the TAR has been verified. Similarly, if in fifth step 809 authorization module 226A determines that the pre-verification criteria have been satisfied, then method 800A proceeds to eighth step 814 where authorization module 226A sets verified flag 414 to 1. If in seventh step 812, authorization module 226A determines that the last record in CARQ 220 has not been processed, then method 800A returns to second step 804 to begin processing the next record in CARQ 220.

Figure 15:
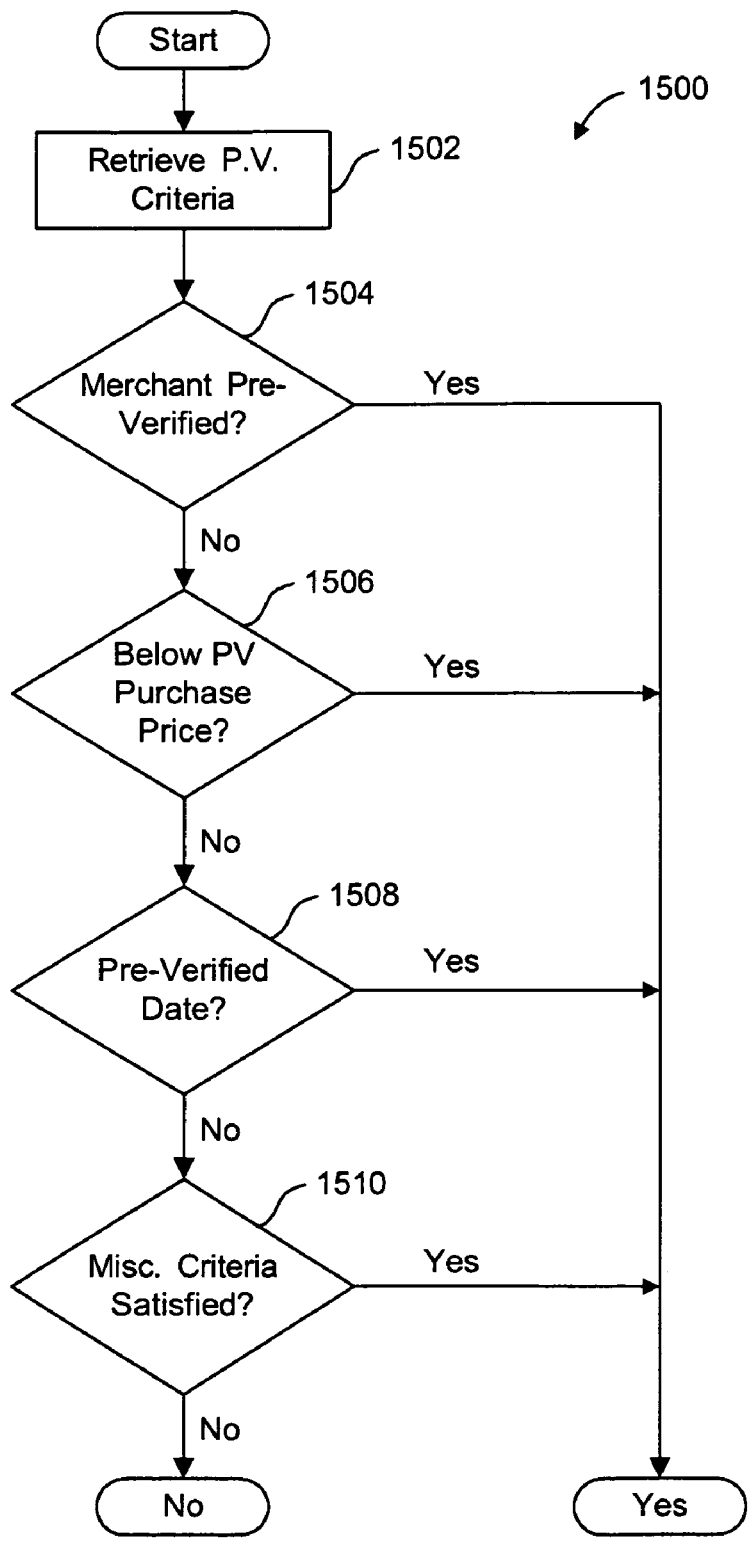
FIG. 15 is a flowchart summarizing one method of performing the fifth step (pre-verification criteria met?) of the method of FIG. 14.

FIG. 15 is a flowchart showing one method 1500 of performing fifth step 809 (determining whether the pre-verification criteria are met) of the method of FIG. 14. In a first step 1502, authorization module 226A retrieves record 1302(*a*) of pre-verification criteria 1102 associated with the card-holder (e.g. card-holder 102(*a*)) identified in the TAR. In a second step 1504, authorization module 226A determines whether one of merchant identifiers 1306(*a*)(1-*r*) of record 1302(*a*) corresponds with the merchant information 410 contained in the TAR. If none of merchant identifiers 1306(*a*)(1-*r*) of record 1302(*a*) identify the merchant, then in a third step 1506 authorization module 226A determines whether the purchase price 408 of the TAR is below the maximum pre-verified purchase price 1310(*a*). If purchase price 408 of the TAR is not below the maximum pre-verified purchase price 1310(*a*), then in a fourth step 1508 authorization module 226A determines if purchase date 412 of the TAR falls within pre-verified dates 1312(*a*). If purchase date 412 does not fall within the dates specified in pre-verified dates 1312(*a*), then in a fifth step 1510 authorization module 226A determines whether miscellaneous pre-verification criteria 1314(*a*) are satisfied. If miscellaneous pre-verification criteria 1314 are not satisfied or the card-holder has not specified any miscellaneous criteria 1314, then method 1500 determines that the pre-verification criteria have not been met.

If in a second step 1504, authorization module 226A determines that one of merchant identifiers 1306(1-*r*) of record 1302(*a*) corresponds with the merchant information 410 contained in the TAR, then method 1500 determines that the pre-verification criteria have been met. If in third step 1506, authorization module 226A determines that purchase price 408 is below pre-verified purchase price 1310(*a*), then method 1500 determines that the pre-verification criteria have been met. Similarly, if in fourth step 1508, authorization module 226A determines that purchase date 412 of the TAR falls within pre-verified purchase dates 1312(*a*), then method 1500 determines that the pre-verification criteria have been met. Finally, if in fifth step 1510 authorization module 226A determines the miscellaneous pre-verification criteria 1314(*a*) are met by the pending TAR, then method 1500 determines that the pre-verification criteria have been met. Those skilled in the art will recognize that method 1500 will determine that a particular TAR meets the pre-verification criteria, and is therefore automatically verified, if any one of the various criteria (e.g., the maximum purchase price) are met.

Figure 15A:
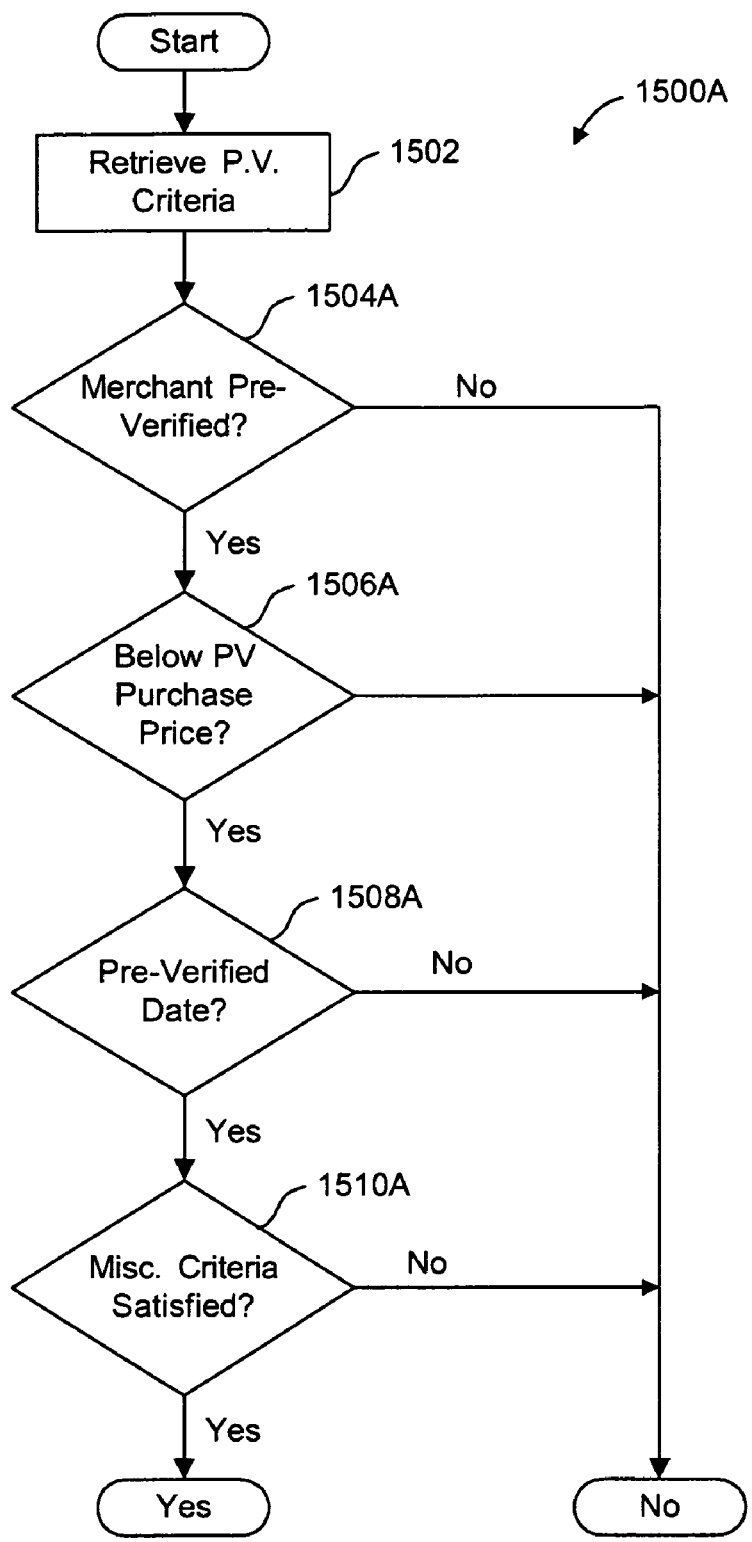
FIG. 15A is a flowchart summarizing an alternate method of performing the fifth step (pre-verification criteria met?) of the method of FIG. 14.

FIG. 15A is a flowchart showing an alternate method 1500A of performing step 809 of the method of FIG. 14, wherein all of the pre-verification criteria must be met before a TAR is automatically verified. In a first step 1502, authorization module 226A retrieves record 1302(*a*) of pre-verification criteria 1102 associated with the card-holder (e.g. card-holder 102(*a*)) identified in the TAR being processed by authorization module 226A. In a second step 1504A, authorization module 226A determines whether one of merchant identifiers 1306(1-*r*) of record 1302(*a*) corresponds with the merchant information 410 contained in the TAR. If none of merchant identifiers 1306(1-*r*) of record 1302(*a*) identify the merchant, then method 1500A determines that the pre-verification criteria are not met by the pending TAR, and method 1500A ends. However, if one of merchant identifiers 1306(1-*r*) of record 1302(*a*) do correspond to the merchant identified in the TAR, then method 1500A proceeds to a third step 1506A wherein authorization module 226A determines whether the purchase price 408 of the TAR is below the maximum pre-verified purchase price 1310(*a*). If purchase price 408 of the TAR is not below the maximum pre-verified purchase price 1310(*a*), then method 1500A determines that the pre-verification criteria are not met, and the method ends. If purchase price 408 of the TAR is below the maximum pre-verified purchase price 1310(*a*), then in a fourth step 1508A authorization module 226A determines if purchase date 412 of the TAR falls within pre-verified dates 1312(*a*). If purchase date 412 does not fall within the dates specified in pre-verified dates 1312(*a*), then method 1500A determines that the pre-verification criteria are not met, and the method ends. If purchase date 412 does fall within the dates specified in pre-verified dates 1312(*a*), then in a fifth step 1510A authorization module 226A determines whether miscellaneous pre-verification criteria 1314(*a*) are satisfied. If miscellaneous pre-verification criteria 1314(*a*) are not satisfied or the card-holder has not specified any miscellaneous criteria 1314(*a*), then method 1500 determines that the pre-verification criteria have not been met, and method 1500A ends. However, if miscellaneous pre-verification criteria 1314(*a*) are satisfied, then method 1500 determines that the pre-verification criteria have been met, and the pending TAR should be automatically verified.

Figure 16:
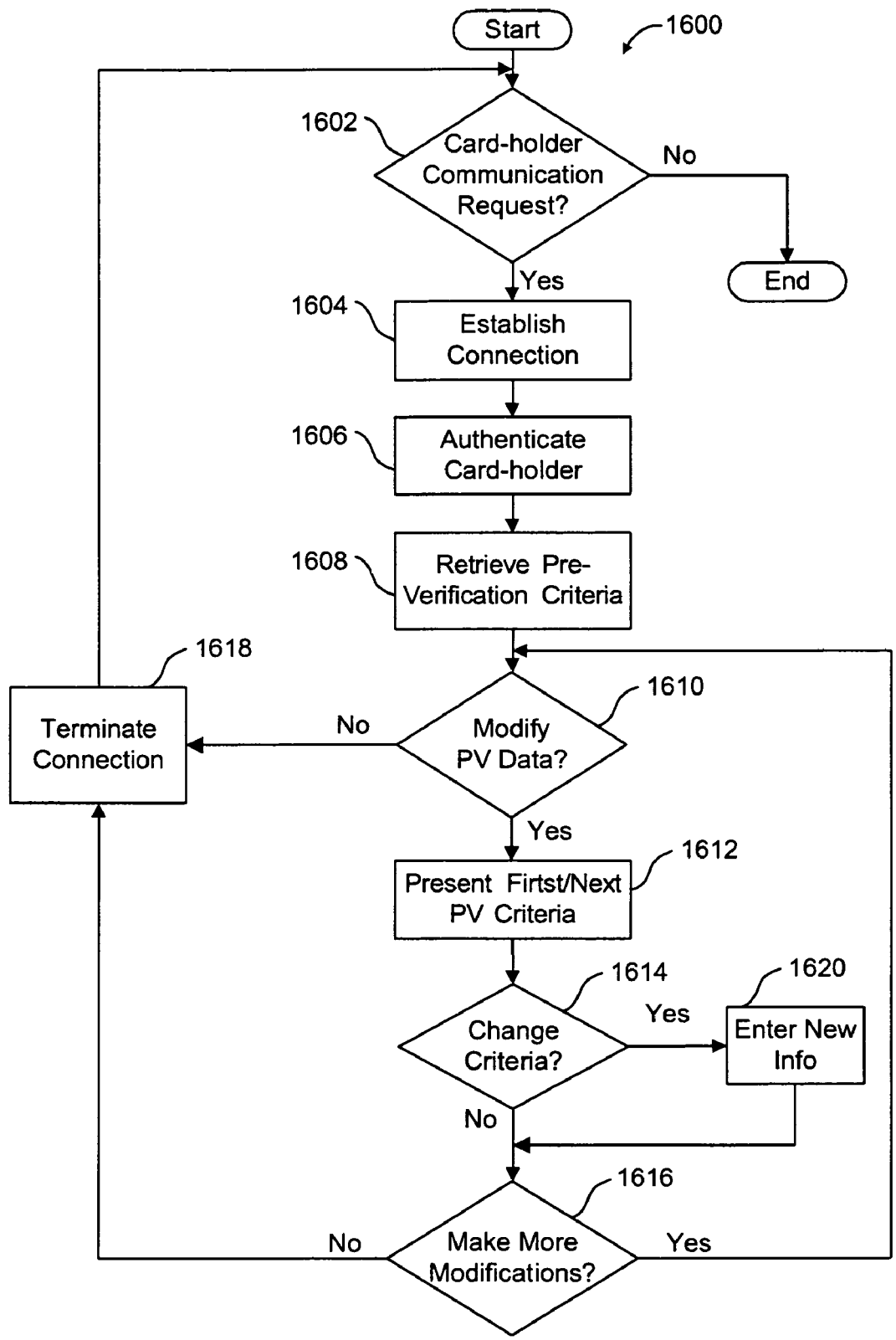
FIG. 16 is a flowchart summarizing one method for a card-holder to modify pre-verification criteria associated with said card-holder's account.

FIG. 16 is a flowchart summarizing one method 1600 for permitting card-holder 102 to modify associated pre-verification criteria 1302. Interactive verification module 306A can perform the same functions as interactive verification module 306, but is further operative to coordinate and control modification of pre-verification criteria records 1302(1-n). In a first step 1602, card-holder communications module 224 polls network interface 204 and telecommunications device 214 to determine whether there are any card-holder communication requests (e.g. a telephone call, network connection requests, etc.) from card-holder 102, and if so then in a second step 1604, interactive verification module 306A establishes a connection with card-holder 102. In a third step 1606, interactive verification module authenticates card-holder 102 (e.g. requires an authentication code) and in a fourth step 1608 interactive verification module 306A retrieves pre-verification criteria 1302 associated with card-holder 102. In a fifth step 1610 interactive verification module 306A determines if card-holder 102 wishes to modify pre-verification criteria 1302 (e.g., receives a touch tone response to a pre-recorded menu). If interactive verification module 306A determines that card-holder 102 wishes to modify pre-verification criteria 1302, then, in a sixth step 1612, interactive verification module 306A presents the first pre-verification criteria (e.g. merchant identifier 1306(1)(1) to card-holder 102. Next, in a seventh step 1614, interactive verification module 306A determines if card-holder 102 wishes to modify the criteria presented in step 1612. If card-holder 102 chooses not to modify the presented pre-verification criteria 1302, then, in eighth step 1616, interactive verification module determines if card-holder 102 wants to proceed to the next pre-verification criteria (e.g. merchant identifier 1306(2)). If the card-holder 102 does not want to continue pre-verification criteria modification, interactive verification module 306A terminates connection with card-holder 102 in ninth step 1618.

If, in first step 1602, there are no communication requests from card-holders, then method 1600 ends. If, in step 1610, card-holder 102 does not want to modify any pre-verification criteria, then method 1600 proceeds to ninth step 1618, where interactive verification module 306A terminates the connection with card-holder 102. If in step 1614 card-holder 102 wishes to modify the presented pre-verification data, then interactive verification module 306A initiates a tenth step 1620, wherein new data is received from card-holder 102, and the new data is substituted for the presented pre-verification criteria before method 1600 proceeds to eighth step 1616. If in eighth step 1616 receives instructions card-holder 102 to make more modifications to pre-verification criteria 1302, then method 1600 returns to step 1610.

Figure 17:
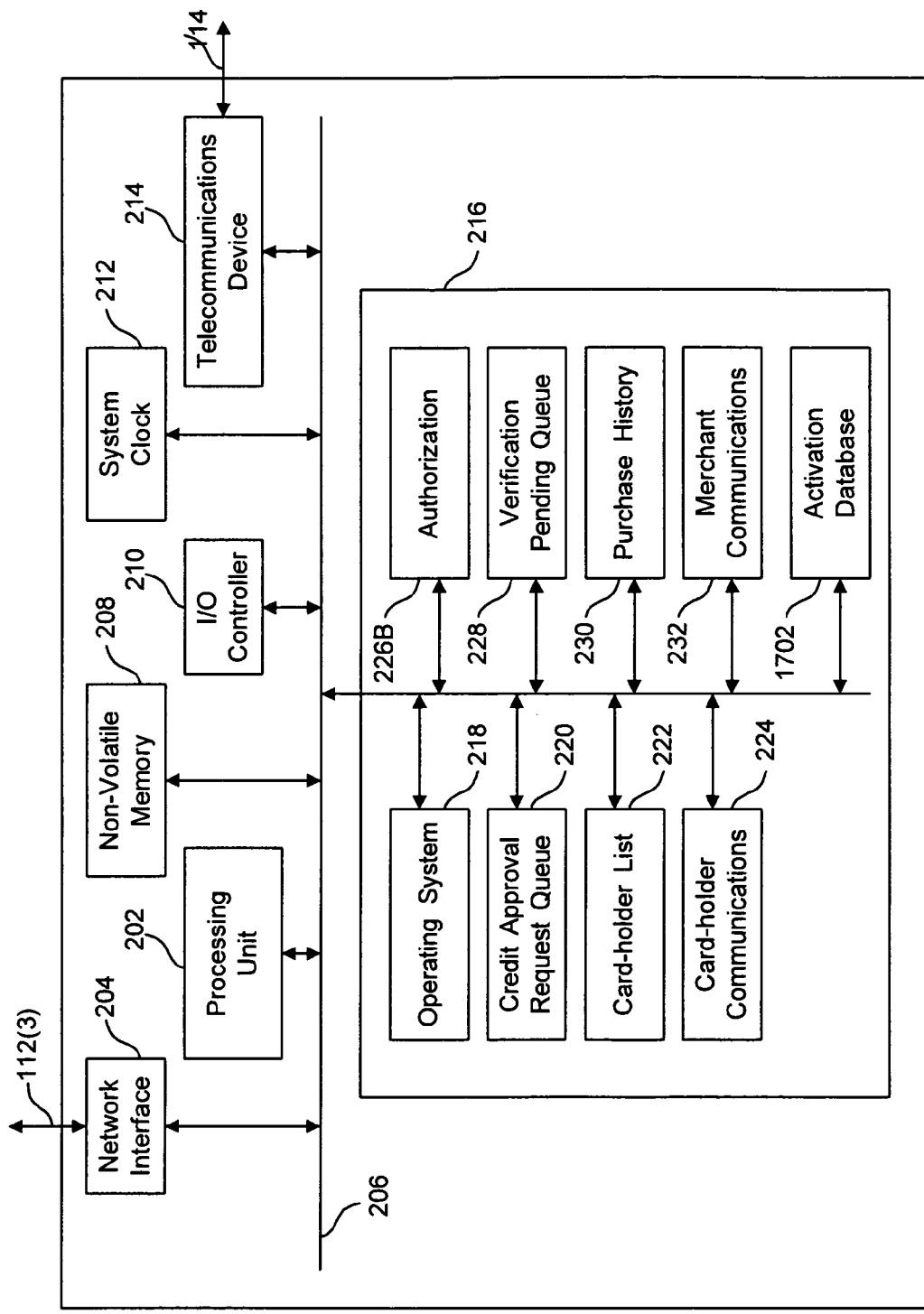
FIG. 17 is a block diagram showing an alternate server including an activation database used to store activation and deactivation data according to the present invention.

FIG. 17 is a block diagram of another alternate server 200B. Server 200B functions similar to server 200 of FIG. 2 and/or server 200A of FIG. 11, except that server 200B includes an activation database 1702 and an alternate authorization module 226B. Authorization module 226B controls and coordinates the approval and verification of TARs and, in addition to the functions performed by authorization modules 226, 226A, evaluates the activation status of card-holder 102's account and automatically denies any TAR having a transaction date and time corresponding to a date and time when card-holder 102's credit account is/was deactivated. Automatically denying every TAR having a transaction date falling within a deactivated time period of the credit account reduces the chance of an unauthorized user successfully making fraudulent purchases with the card-holder's credit account.

Activation database 1702 is a database that includes activation data/conditions for current customers of credit card company 106, including card-holder 102. Activation conditions can include, but are not limited to, particular dates and/or times input by card-holder 102 to either activate or deactivate their account, particular dates and time when card-holder 102 activates or deactivates the account, or other specific activation and deactivation criteria defined by card-holder 102. For example, card-holder 102 could specify times of the day only during which the credit card would be activated. As another example, card-holder 102's credit card could be automatically deactivated after a predetermined number (e.g., one) of transaction approval requests are received. Card-holder 102 could either define such criteria when the account is opened (e.g., on the application form) or after the account is opened by connecting remotely with server 200B via card-holder communications module 224.

It should also be noted that activation database 1702 would typically be a very large file. Therefore, while activation database 1702 is shown in memory 216, it should be understood that the entire customer files would likely be stored in a mass data storage system such as non-volatile memory 208, with portions of the entire database being swapped in and out of activation database 1702 as necessary.

Figure 18:
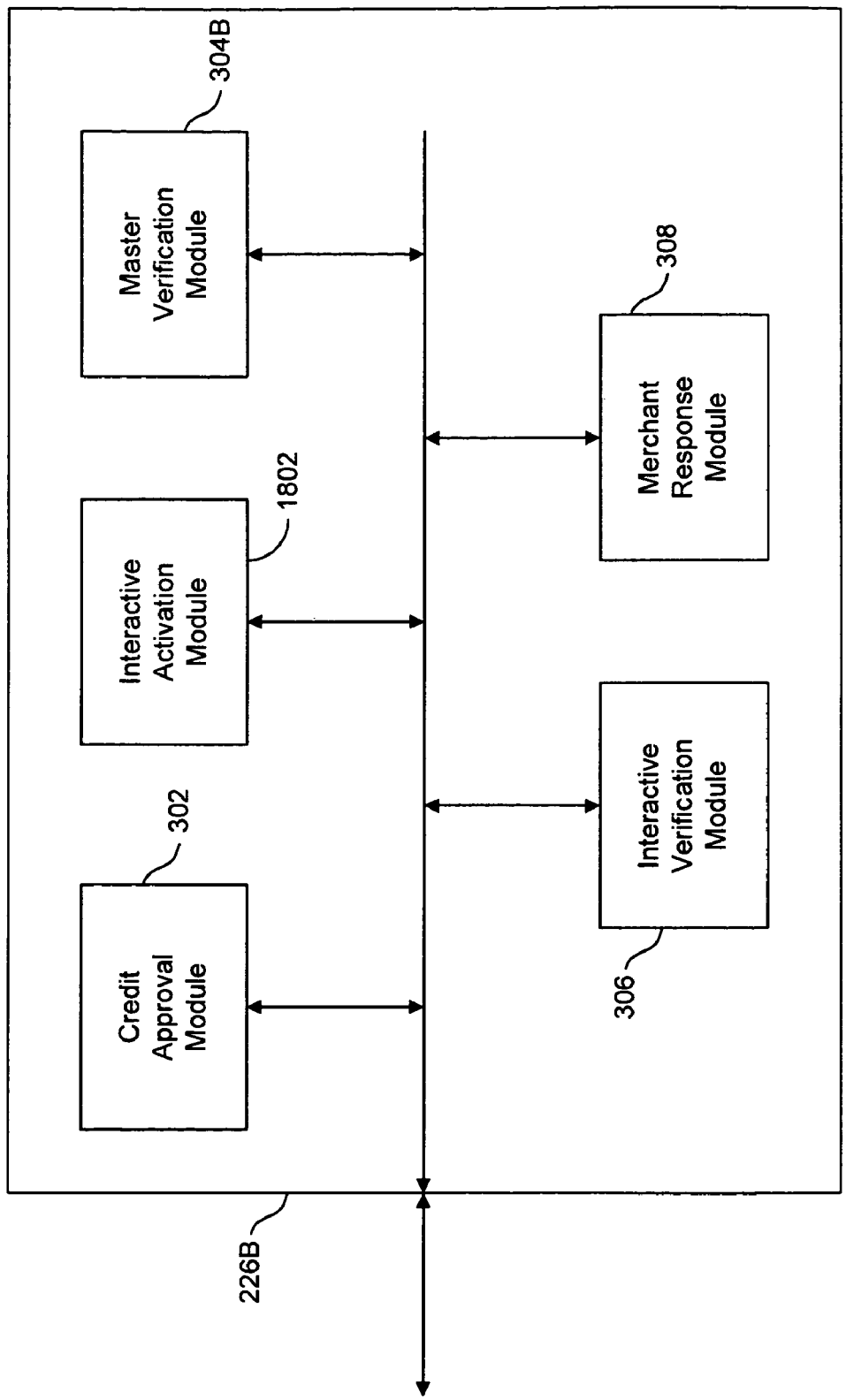
FIG. 18 is a block diagram detailing the alternate authorization module of FIG. 17.

FIG. 18 shows a block diagram of authorization module 226B to include a credit approval module 302, an alternate master verification module 304B, an interactive verification module 306, a merchant response module 308, and an interactive activation module 1802. Credit approval module 302 executes conventional credit approval for each TAR contained in CARQ 220 by means well known to those skilled in the art. Master verification module 304B coordinates the authorization and verification processes, including determining the activation status of an account, and is responsible for overall control of authorization module 226B. Interactive verification module 306 carries out verification with card-holder 102. Merchant response module 308 communicates with merchant 104 by transmitting either a transaction approval or a transaction denial. Interactive activation module 1802 coordinates modification of the activation status of the account associated with card-holder 102. After establishing a connection with and authenticating card-holder 102 (e.g., via card-holder communications module 224), interactive activation module 1802 is operative to present the current activation status of card-holder 102's account, and to receive modification instructions from card-holder 102 to change the activation status of the associated account. Optionally, interactive activation module 1802 is operative to transfer card-holder 102 to interactive verification module 306 such that card-holder 102 can verify pending TARs or modify pre-verification criteria if authorization module 226B also includes the functions of authorization module 226A.

Figure 19:
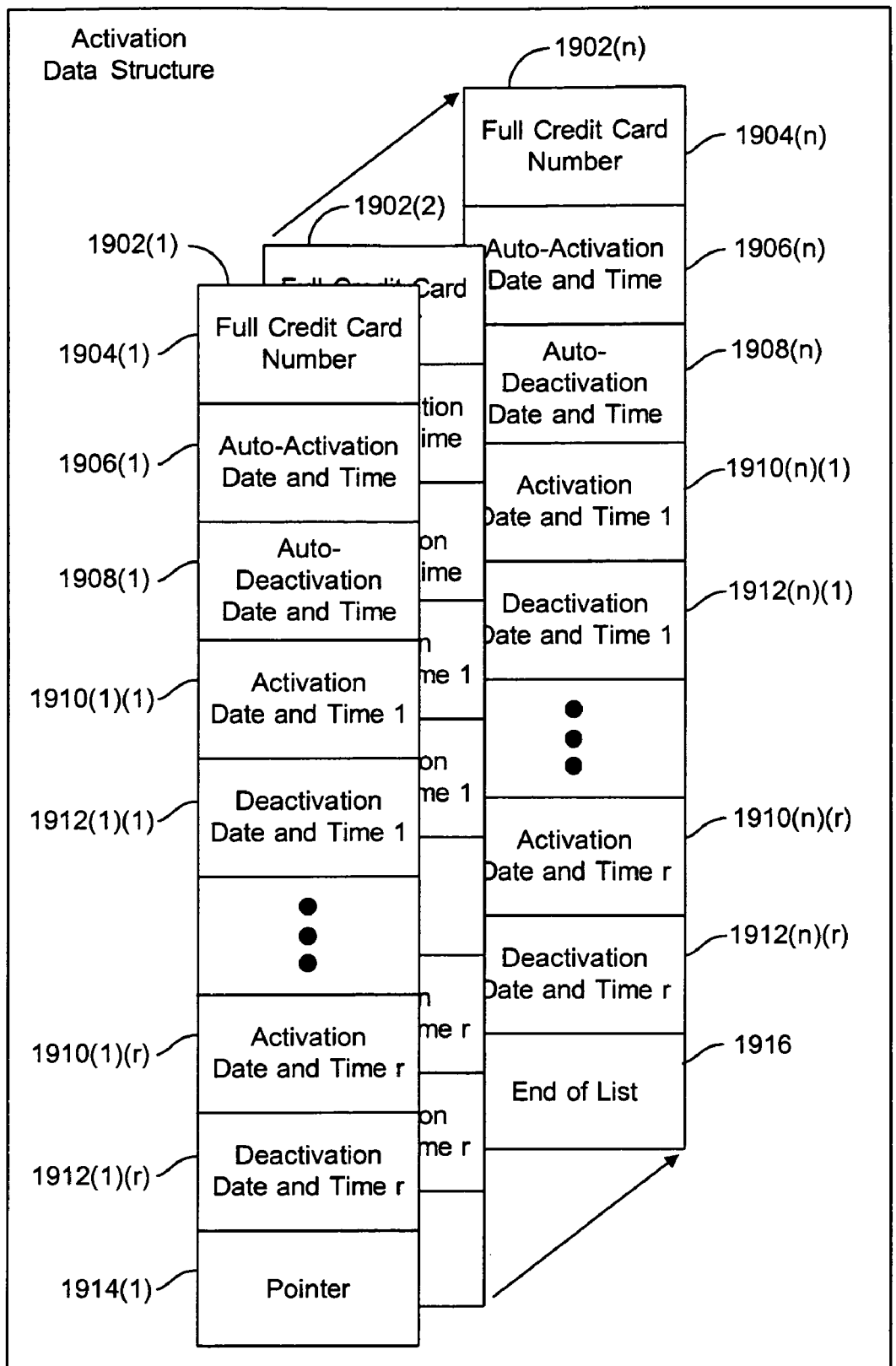
FIG. 19 is a block diagram showing an exemplary data structure for storing the activation data in the activation database of FIG. 17.

FIG. 19 shows an example of an activation data structure 1900 suitable for use in activation database 1702 of the present invention. Activation data structure 1900 includes a linked list of activation records 1902(1)-1902(n) associated with customer accounts of credit card company 106, including card-holder 102's account. Each record 1902(1-n) includes an account identifier (e.g., a credit card number) field 1904, and a series of activation and deactivation conditions/entries including an automatic activation date and time field 1906, an automatic deactivation date and time field 1908, a first activation field 1910(1), a first deactivation field 1912(1), a last activation field 1910(r), a last deactivation field 1912(r), and a pointer field 1914 pointing to the next activation record 1902. Activation record 1902(n) includes an "End of List" record 1916 instead of pointer 1914, indicating that activation record 1902(n) is the last activation record in activation database 1702.

Credit card number field 1904 is the key field of each activation record 1902, and is used to identify activation settings/entries associated with a particular customer of credit card company 106 (e.g., card-holder 102). Automatic activation and deactivation date and time fields 1906 and 1908 store automatic activation and deactivation data associated with card-holder 102. For example, card-holder 102 could set auto-activation field 1906 to automatically activate his/her credit card each morning at 8:00 a.m., and set auto-deactivation field 1908 to automatically deactivate his/her credit card each evening at 8:00 p.m. As another option, card-holder 102 could set automatic activation field 1906 and automatic deactivation field 1908 to automatically deactivate his/her credit card over the weekdays, or alternately the weekends, of each month. Indeed, any desirable automatic "on-off" schedule can be specified by card-holder 102. Activation date and time field 1910($x$)(1) stores the date and time card-holder 102 initially activates his/her credit card, where ($x$) represents the activation record 1902($x$) associated with card-holder 102 (e.g., record 1902(1)(1)). De-activation date and time field 1912($x$)(1) indicates the first date and time that card-holder 102 selectively deactivated their credit card (e.g., via telephone, secure website, etc.), such that transactions could no longer be made. Additional activation and deactivation fields are added to each record 1902, as the credit card is subsequently activated and deactivated by card-holder 102. The last (i.e., the most recent) activation record 1910($x$)($r$) and deactivation record 1912($x$)($r$) are stored in card-holder 102's activation record 1902($x$), followed by a pointer 1914($x$), pointing to the next activation record 1902(x+1). The final activation record 1902($n$) has an "end of list" indicator 1916 instead of a pointer 1914 indicating that activation record 1902($n$) is the final record in activation database 1702. Although data structure 1900 is illustrated as a simple liked list, it should be understood that data structure 1900 can be implemented in a relational database containing records including similar data fields.

Master verification module 304B utilizes the activation data stored in each activation record 1902 as follows. Once a TAR is received and associated with a particular card-holder, master verification module 304B determines the state of activation of the card-holder's account based on the purchase date and time included in the TAR. If the purchase date and time falls during a time when the card-holder's credit card was deactivated, then master verification module 304B is operative to automatically deny the TAR. As shown in records 1902(1-n), a deactivated purchase date and time would correspond to any date and time defined by Auto Deactivation date and time field 1908, or any time period between a deactivation date and time and the following reactivation date and time stored in record 1902. For example, if auto-deactivation date and time field 1908 indicated that the card-holder's account is automatically deactivated at the beginning of each weekend, and a TAR was received having a purchase date and time corresponding to a weekend date, then master verification module 304B would be operative to set denied flag 418 to a value of 1 (e.g., denied) because the purchase was made on a weekend (assuming the card-holder did not reactivate the card over the weekend in question). As another example, if the purchase was made after the deactivation date and time stored in deactivation date and time field 1912($x$)(1), and before the re-activation date stored in activation date and time field 1910($x$)(2), the TAR would also be denied.

In the presently described embodiment, the information stored in activation and deactivation fields 1910($x$)(1)-1910($x$)($r$) and 1912($x$)(1)-1912($x$)($r$) and the automatic activation and deactivation data stored in fields 1904(1) and 1906(1) are all evaluated during the approval process. Thus, card-holder 102 can activate the account after an automatic deactivation, but prior to the next automatic activation, simply by making a new activation entry 1910 in record 1902. Accordingly, there are no conflicts between automatic activation/deactivation and subsequent card-holder activations/deactivations. Rather, all activation/deactivation data, whether automatic or individually entered, are considered as equally valid points on a time line.

Storing activation and deactivation data in database 1702 also provides another particular advantage. In cases where TARs are not sent to the credit card company for several days after the transaction is initiated, the card-holder may still deactivate their card without worry of TARs of earlier transactions being denied. Master verification module 304B, when receiving a TAR, is operative to compare the purchase date and time included in the TAR with each of activation records 1910($x$)(1)-1910($x$)($r$) and each of deactivation records 1912($x$)(1)-1912($x$)($r$). Therefore, as long as the purchase date and time included with the TAR is correct and corresponds with an activated state, the TAR is passed to the previously described credit approval and verification processes for processing.

Figure 20:
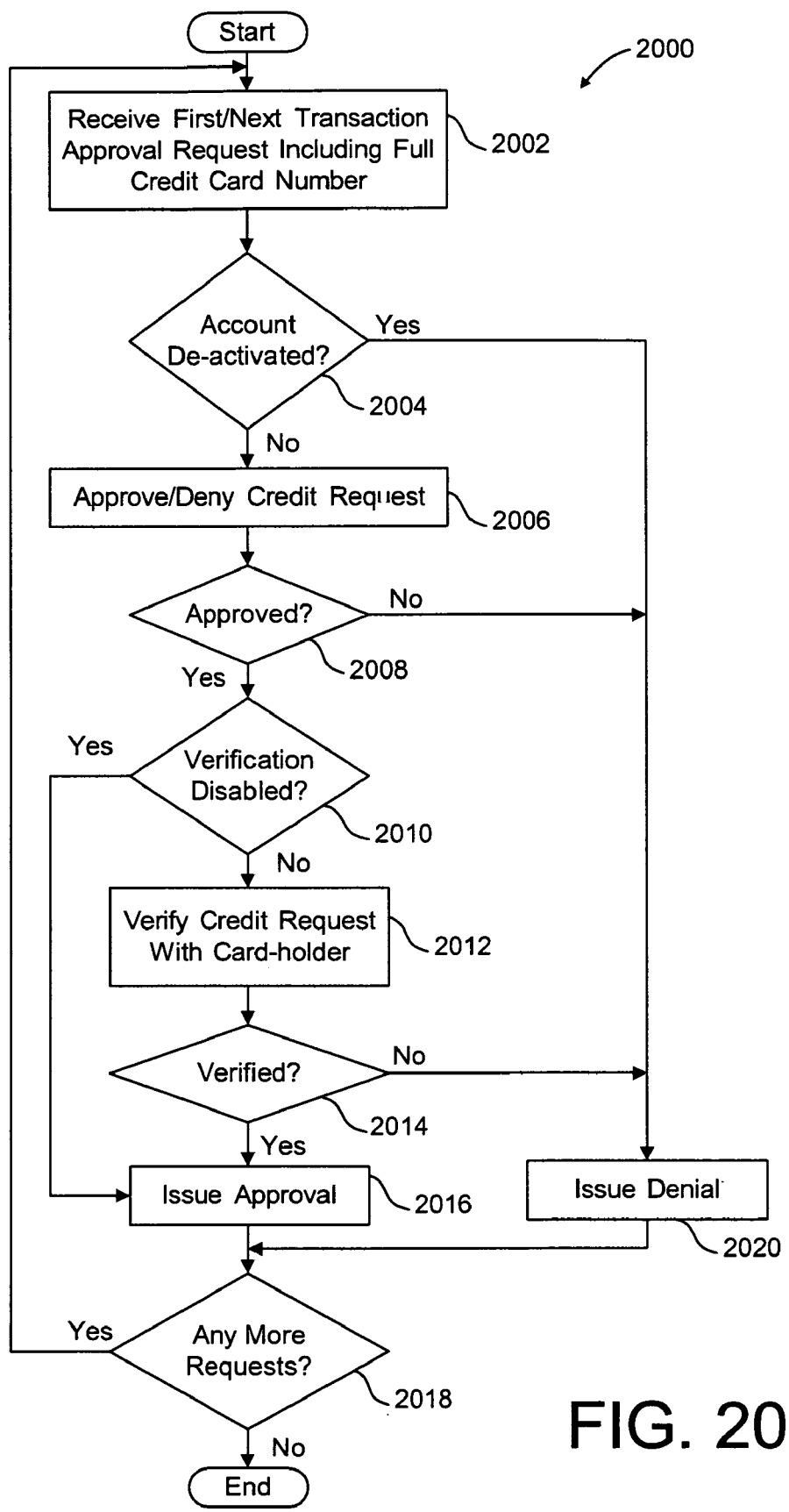
FIG. 20 is a flowchart summarizing yet another method of processing electronic transactions according to the present invention.

FIG. 20 is a flowchart summarizing a method 2000 of processing a TAR in accordance with one particular embodiment of the present invention. In a first step 2002 merchant communications module 232 of server 200B receives a TAR including an account identifier (e.g., a credit card number) from a merchant 104, generates a TAR record 402, and writes TAR record 402 into CARQ 220. In a second step 2004, authorization module 226B determines if card-holder 102 has selectively deactivated their credit card. If not, then in a third step 2006 authorization module 226B subjects TAR record 402 to a conventional credit approval process, and sets approved flag 416 or denied flag 418 to indicate whether the requested credit is approved or denied. In a fourth step 2008, authorization module 226B determines from flags 416 and 418 whether the requested credit has been approved or denied. If, in fourth step 2008, authorization module 226B determines that the requested credit has been approved, then in a fifth step 2010 authorization module 226B determines whether card-holder 102 has selectively disabled the verification process. If the verification process has not been selectively disabled, then in a sixth step 2012 authorization module 226B verifies the transaction with card-holder 102. Then, in a seventh step 2014 authorization module 226B determines whether the TAR has been verified by card-holder 102. If the TAR has been verified, then in an eighth step 2016 merchant communications module 232 transmits a transaction approval to merchant 104. Next, in a ninth step 2018, authorization module 226B determines whether there are any more TAR records in CARQ 220. If there are no more records in CARQ 220, then method 2000 ends.

If, in second step 2004, authorization module 226B determines that card-holder 102 has deactivated their credit card, then method 2000 proceeds to a tenth step 2020 where merchant communications module 232 transmits a denial to merchant 104. If, in fourth step 2008, authorization module 226B determines that the credit request has been denied, then method 2000 proceeds to tenth step 2020 where merchant communications module 232 transmits a denial to merchant 104. If, in fifth step 2010, authorization module 226B determines that the verification process has been selectively disabled, then method 2000 proceeds to eighth step 2016 where merchant communications module 232 transmits an approval to merchant 104. If, in seventh step 2014, authorization module 226B determines that the TAR has not been verified by card-holder 102, then method 2000 proceeds to tenth step 2020 where merchant communications module 232 transmits a denial to merchant 104. Finally, if in ninth step 2018 authorization module 226B determines that there are more pending TAR records in CARQ 220, then method 2000 returns to first step 2002 to process the next record in CARQ 220.

Figure 21:
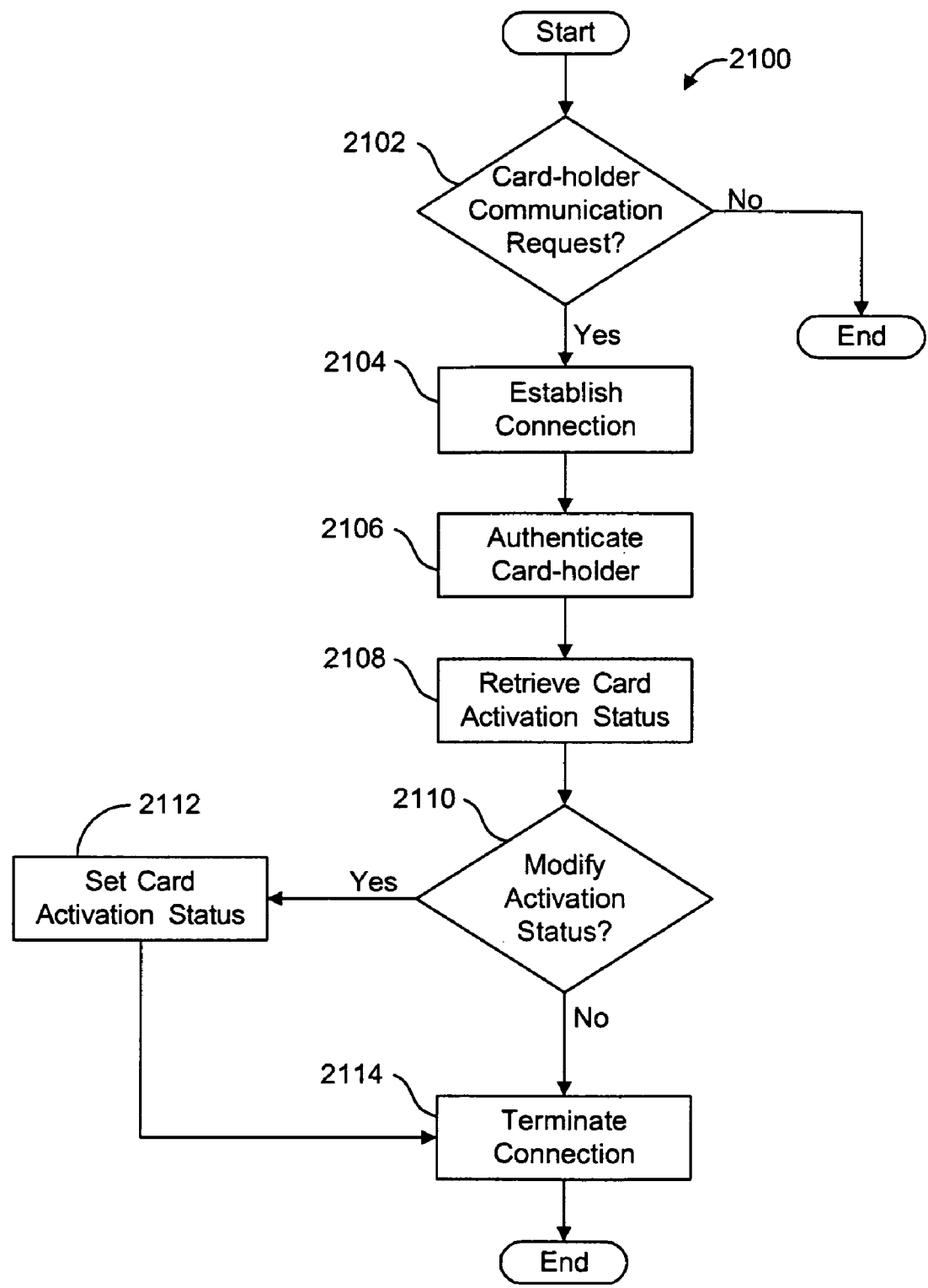
FIG. 21 is a flowchart summarizing one method for allowing a card-holder to modify the activation status of the card-holder's account.

FIG. 21 is a flowchart summarizing one method 2100 for permitting card-holder 102 to modify the activation status of his/her account. In a first step 2102, card-holder communications module 224 polls network interface 204 and telecommunications device 214 to determine whether there are any card-holder communication requests (e.g. a telephone call, network connection requests, etc.) from card-holder 102, and if so then in a second step 2104, interactive activation module 1802 establishes a connection with card-holder 102. In a third step 2106, interactive activation module 1802 authenticates card-holder 102 (e.g. requires an authentication code), and in a fourth step 2108 interactive activation module 1802 retrieves the activation status of the credit card account associated with card-holder 102. In a fifth step 2110 interactive activation module 1802 determines if card-holder 102 wishes to modify the activation status of the credit card (e.g., receives a prompt from a pre-recorded menu). If card-holder 102 wishes to modify the activation status of the account, method 2100 proceeds to a sixth step 2112, where card-holder 102 can set the activation status of the credit account, optionally including defining automatic activation and deactivation date and times or other activation/deactivation data. Then, in a seventh step 2114, interactive activation module 1802 terminates the connection with card-holder 102.

If in fifth step 2110, card-holder 102 does not wish to modify the activation status of the credit card, method 2100 proceeds to seventh step 2114 and terminates the connection with card-holder 102. Optionally, interactive activation module 1802 could instead transfer card-holder 102 to interactive verification module 306 (or 306A), or some other service module, where the card-holder could instruct interactive verification module 306 (or 306A) to verify TARs or modify pre-verification criteria 1302.

Figure 22:
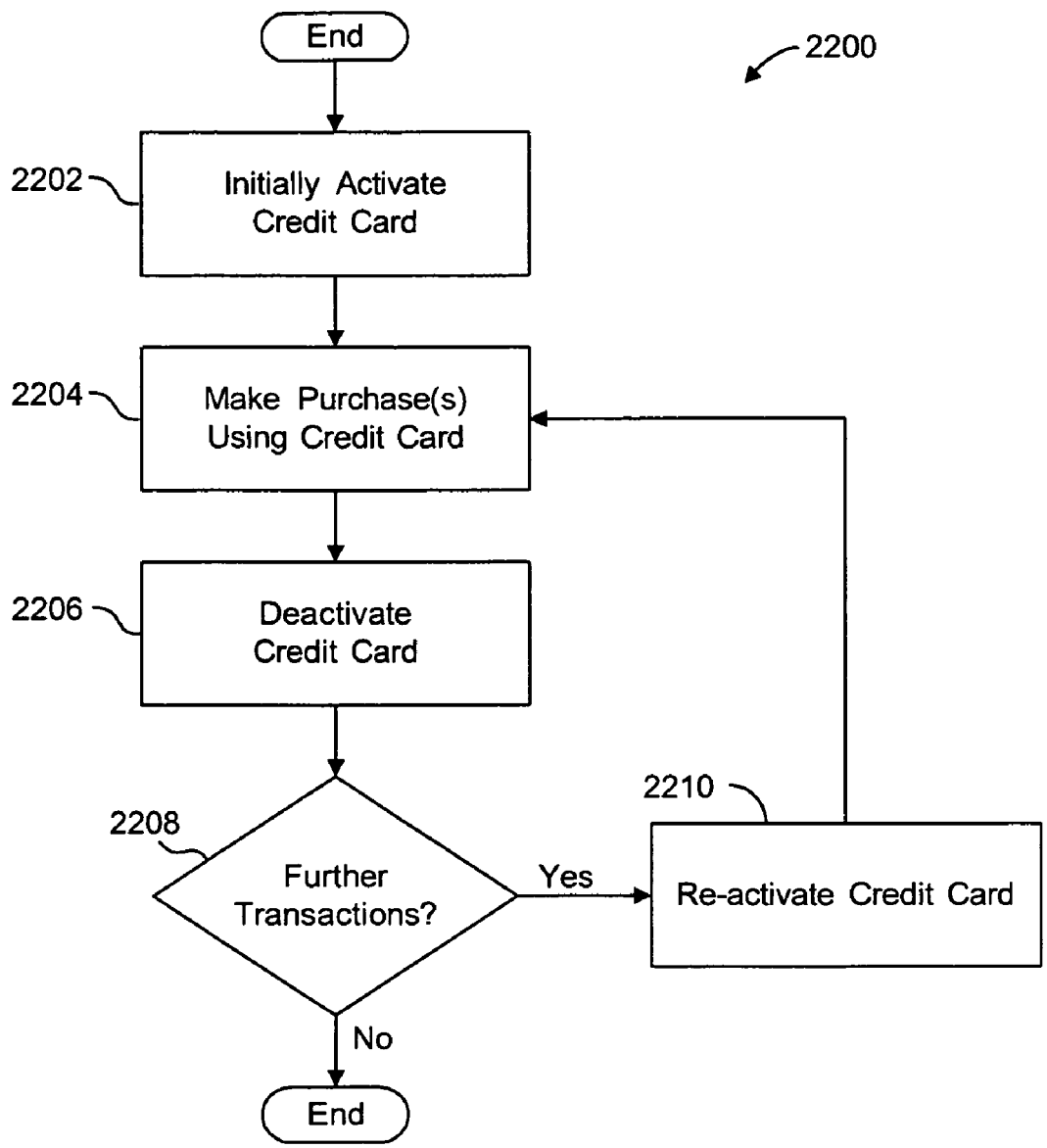
FIG. 22 is a flowchart summarizing one method for selectively activating/deactivating an account according to the present invention.

FIG. 22 is a flowchart summarizing one method 2200 for making commercial transactions according to the present invention, including card-holder 102 selectively activating and deactivating a credit account. In a first step 2202, card-holder 102 activates the credit card via conventional means, such as by calling an automated service when their credit card is first received in the mail. The initial activation date and time is stored in the first activation field (e.g., activation date and time field 1910(1)(1)) of the record 1902(x) in activation database 1702 associated with card holder 102. In a second step 2204, card-holder 102 makes one or more purchases with the credit card. Then, in a third step 2206 card-holder 102 deactivates the credit card by, for example, connecting with server 200B, via card-holder communications module 224, and instructing interactive activation module 1802 to record a deactivation date and time in an associated activation record 1902 (e.g., in deactivation date and time 1912(1)(1)). Next, in a fourth step 2208, card-holder 102 determines if he/she needs to make any further commercial transactions. If more transactions are desired, card-holder 102 reconnects with server 200B and reactivates the credit card by instructing interactive activation module 1802 to record a next activation date and time (e.g., activation date and time 1910(1)(2)), so that additional purchase can be made.

However, if in step 2208 no further transactions are necessary, the credit account associated with card-holder 102 remains deactivated and protected, thereby preventing unauthorized use of card-holder 102's account.

Figure 23:
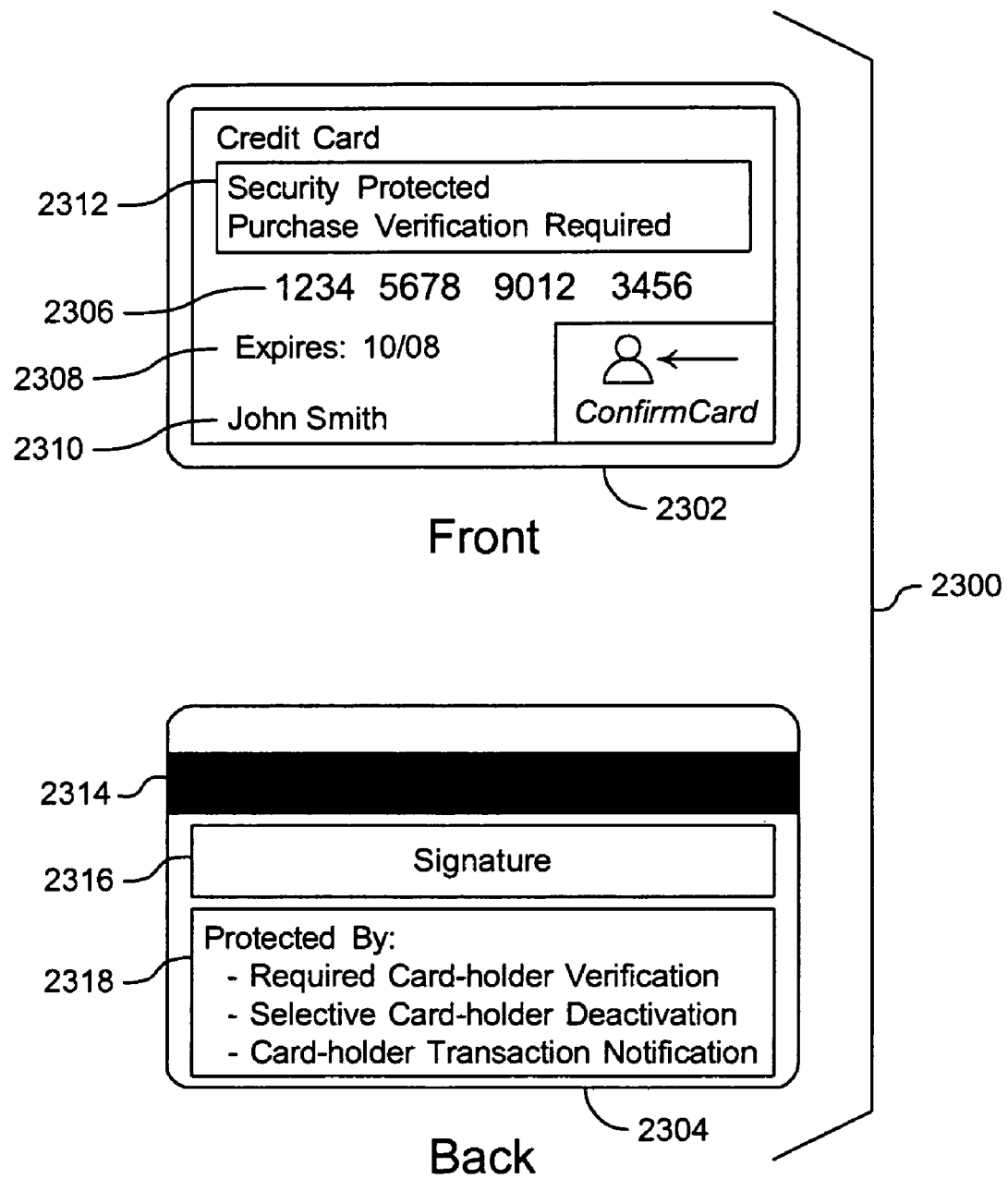
FIG. 23 shows a credit card having security indicia thereon indicating that the associated card-holder's account is protected by one or more security features.

FIG. 23 shows a credit card 2300 having a front side 2302 and a back side 2304. Front side 2302 of credit card 2300 has account indicia including an account number 2306, an expiration date 2308, and the name 2310 of a card-holder (e.g., card-holder 102). Front side 2302 of card 2300 also includes security indicia 2312.

Account number 2306, expiration date 2308, and name 2310 are common features of credit cards and are associated with the credit account of card-holder 102. Security indicia 2312, however, is an inventive feature that indicates that transactions made with card 2300 are protected by one or more security features, including but not limited to the security features of the present invention. Security indicia 2312 alerts would-be thieves that attempts to make illegal transactions using credit card 2300 and/or the associated credit account number 2306 would be difficult, because purchases require account-holder verification.

Back side 2304 of credit card 2300 includes a magnetic stripe 2314, a signature field 2316, and a second security indicia 2318. Magnetic stripe 2314 contains electronically readable account data such that card 2300 can be swiped through a card reader, and signature field 2316 provides a place for card-holder 102 to sign credit card 2300. Finally, second security indicia 2318 is an inventive feature that provides a more detailed description of the transaction security features associated with the account linked to credit card 2300. Security indicia 2318 (like indicia 2312) deter would-be thieves by indicating that illegally using credit card 2300 will be particularly difficult. It is thought that indicia indicating that account-holder verification is required will be effective to provide a significant reduction in fraudulent use, even if other security features are not fully implemented.

The description of particular embodiments of the present invention is now complete. Many of the described features may be substituted, altered or omitted without departing from the scope of the invention. For example, the present invention may be implemented in conjunction with alternate types of accounts (e.g. debit accounts) requiring secure processing in addition to the credit card type account described herein. As another example, a third party verification company 108 may employ the transaction processing methods described herein on behalf of credit card company 106, and then transmit indicia of verification to credit card company 106. Further, while pre-verification criteria 1102 is shown in FIG. 11 as a separate block, those skilled in the art will understand that pre-verification criteria may instead be stored within other records such as card-holder list 222. Similarly, the functionality of card-holder communications module 224 and interactive verification module 306 can be combined into a single operative module. In fact, the functional modules of the present disclosure are organized and labeled to provide a clear illustration of the invention, and no particular segregation of functionality is considered to be an essential element of the present invention. These and other deviations from the particular embodiments shown will be apparent to those skilled in the art, particularly in view of the foregoing disclosure.

I claim:

1. A computer system for approving a commercial transaction between a user with account information and a merchant, said computer system comprising:
    a processing unit for processing data and code; and
    memory for storing said data and said code, said data and said code together including
        a merchant communications module operative to facilitate a connection with said merchant for receiving a transaction approval request (TAR), activation data accessible to an account-holder, said activation data indicative of the activation status of an account associated with said account-holder and with said account information, an interactive activation module operative to establish a connection with said account-holder, to receive instructions from said account-holder to modify said activation data, and to modify said activation data according to said instructions received from said account-holder, and an authorization module responsive to said TAR and operative to deny said TAR if said account associated with said account-holder is deactivated; and wherein prior to said user initiating said transaction with said merchant, said interactive activation module establishes a first connection with said account-holder, receives activation instructions from said account-holder to activate said account, and modifies said activation data to activate said account, said account being previously deactivated, thereby facilitating approval of said TAR;

subsequent to receipt of said TAR, said interactive activation module establishes a second connection with said account-holder, receives deactivation instructions from said account-holder to deactivate said account, and modifies said activation data to deactivate said account such that subsequent TARs will be denied; and in the absence of said deactivation instructions, said account remains activated such that subsequent TARs may be approved.

2. A computer system according to claim 1, wherein:
said activation data includes at least one activation condition; and
said authorization module is operative to approve said TAR only if said TAR satisfies said activation condition.

3. A computer system according to claim 2, wherein:
said activation condition comprises an activation date and time corresponding to a date and time that said instructions to activate said account were received from said account-holder; and
said authorization module is operative to approve said TAR only if a purchase date and time contained in said TAR falls after said activation date and time.

4. A computer system according to claim 2, wherein:
said activation data further includes at least one deactivation condition; and
said authorization module is operative to approve said TAR only if said TAR satisfies said activation condition and does not satisfy said deactivation condition.

5. A computer system according to claim 4, wherein:
said deactivation condition comprises a deactivation date and time corresponding to a date and time that said instructions to deactivate said account were received from said account-holder; and
said authorization module is operative to approve said TAR only if said purchase date and time contained in said TAR falls after said activation date and time and before said deactivation date and time.

6. A computer system according to claim 5, wherein:
said activation data includes a second activation condition defining a reactivation date and time corresponding to a date and time that reactivation instructions to reactivate said account were received from said account-holder; and
said authorization module is operative to approve said TAR only if said purchase date and time contained is said TAR falls after said activation date and time and before said deactivation date and time or falls after said reactivation date and time.

7. A computer system according to claim 1, wherein:
said activation data further includes at least one automatic activation or deactivation criteria determined by said account-holder; and
said authorization module is operative to automatically modify said activation data to change the activation status of said account based on said automatic activation or deactivation criteria.

8. A computer system according to claim 7, wherein:
said automatic deactivation criteria facilitates deactivation of said account if a predetermined number of TARs are received within a predetermined time period, said predetermined number of TARs determined by said account-holder; and
said authorization module is operative to automatically deactivate said account by recording a date and time in said activation data corresponding to the date and time at which said predetermined number of TARs is reached.

9. A computer system according to claim 1, wherein:
said code further includes an account-holder communications module operative to facilitate a separate connection with said account-holder for verifying said TAR; and
said authorization module is further operative to transmit an approval to said merchant only if said TAR is verified by said account-holder.

10. A computer system according to claim 1, wherein:
said data further includes at least one pre-verification criteria associated with said account-holder;
said authorization module is operative to transmit an approval to said merchant only if said TAR is verified; and
said authorization module is further operative to compare said TAR with said at least one pre-verification criteria, and to automatically verify said TAR without verifying said TAR with said account-holder if said at least one pre-verification criteria is satisfied.

11. A computer system according to claim 1, wherein:
said interactive activation module establishes said first connection with said account-holder responsive to receiving a first connection request from said account-holder; and
said interactive activation module establishes said second connection with said account-holder responsive to receiving a second connection request from said account-holder, said second connection request received after said first connection with said account-holder has been terminated.

12. A computer system according to claim 1, wherein each time said account is activated, said account remains activated indefinitely until said account is deactivated by said account-holder.

13. A computer system according to claim 12, wherein each time said account is activated, the duration that said account is activated is determined at the time said account is deactivated by said account-holder.

14. A computer system according to claim 1, wherein said user is said account-holder.

15. In a computer system, a method for facilitating commercial transactions between a user with account information and a merchant, said method comprising:
establishing a first connection with said account-holder responsive to receiving a first connection request from said account-holder;

receiving, via said first connection, activation instructions from said account-holder to temporarily activate an account associated with said account-holder and said account information, said account being previously deactivated;

modifying activation data associated with said account to activate said account in response to receiving said activation instructions;

receiving a transaction approval request (TAR) from said merchant, said TAR indicative of a commercial transaction between said user and said merchant;

establishing a second connection with said account-holder responsive to receiving a second connection request from said account-holder;

receiving deactivation instructions from said account-holder to again deactivate said account, said deactivation instructions being received via said second connection and subsequent to said TAR and said activation instructions;

modifying said activation data to deactivate said account in response to receiving said deactivation instructions;

determining whether said account was deactivated at a time associated with said TAR; and denying said TAR if said account was deactivated at said time associated with said TAR.

16. A method according to claim 15, further comprising:

storing the dates and times that said activation instructions and said deactivation instructions were received; and wherein said step of determining whether said account was temporarily deactivated includes comparing a purchase date and time included in said TAR with said dates and times that said activation instructions and said deactivation instructions were received; and said step of denying said TAR includes denying said TAR if said purchase date and time is before said date and time that said activation instructions were received or after said date and time that said deactivation instructions were received.

17. A method according to claim 16, further comprising:

establishing a third connection with said account-holder responsive to receiving a third connection request from said account-holder;

receiving reactivation instructions from said account-holder to again activate said account, said reactivation instructions being received via said third connection and subsequent to receipt of said deactivation instructions;

modifying said activation data to reactivate said account in response to said reactivation instructions; and storing the date and time that said reactivation instructions were received.

18. A method according to claim 17, further comprising:

receiving a second TAR from a second merchant, said second TAR indicative of a transaction between said user and said second merchant;

determining whether said account was reactivated at a time associated with said second TAR; and approving said second TAR only if said account was reactivated at said time associated with said second TAR.

19. A method according to claim 18, wherein:

said step of determining whether said account was reactivated includes comparing a purchase date and time included in said second TAR with said date and time that said reactivation instructions were received; and said step of approving said second TAR includes approving said second TAR only if said purchase date and time of said second TAR is after said date and time that said reactivation instructions were received.

20. A method according to claim 15, further comprising:

storing at least one automatic deactivation criteria associated with said account-holder; and automatically deactivating said account when said at least one deactivation criteria is met.

21. A method according to claim 20, wherein:

said at least one deactivation criteria includes receiving a predetermined number of TARs; and said step of automatically temporarily deactivating said account includes deactivating said account after the receipt of said predetermined number of TARs.

22. A method according to claim 15, further comprising:

establishing a separate connection with said account-holder;

verifying said TAR with said account-holder via said separate connection; and approving said TAR only if said TAR is verified.

23. A method according to claim 15, further comprising:

receiving at least one pre-verification criteria associated with said account-holder;

comparing said TAR with said at least one pre-verification criteria;

automatically verifying said TAR without input from said account-holder if said at least one pre-verification criteria is satisfied; and approving said TAR only if said TAR is verified.

24. A method according to claim 15, wherein each time said account is activated, said account remains activated indefinitely until said account is deactivated by said account-holder.

25. A method according to claim 24, wherein each time said account is activated, the duration that said account is activated is determined at the time said account is deactivated by said account-holder.

26. A method according to claim 15, wherein said user is said account-holder.

27. A non-transitory, electronically-readable storage medium having code embodied therein for causing an electronic device to perform a method of facilitating commercial transactions between a user with account information and a merchant, said method comprising the steps of:

establishing a first connection with said account-holder responsive to receiving a first connection request from said account-holder;

receiving, via said first connection, activation instructions from said account-holder to temporarily activate an account associated with said account-holder and said account information, said account being previously deactivated;

modifying activation data associated with said account to activate said account in response to receiving said activation instructions;

receiving a transaction approval request (TAR) from said merchant, said TAR indicative of a commercial transaction between said user and said merchant;

establishing a second connection with said account-holder responsive to receiving a second connection request from said account-holder;

receiving deactivation instructions from said account-holder to again deactivate said account, said deactivation instructions being received via said second connection and subsequent to said TAR and said activation instructions;

modifying said activation data to deactivate said account in response to receiving said deactivation instructions;

determining whether said account was deactivated at a time associated with said TAR; and denying said TAR if said account was deactivated at said time associated with said TAR.

28. A non-transitory, electronically-readable storage medium according to claim 27, wherein:

said method further includes the step of storing the dates and times that said activation instructions and said deactivation instructions were received;

said step of determining whether said account was temporarily deactivated includes comparing a purchase date and time included in said TAR with said dates and times that said activation instructions and said deactivation instructions were received; and said step of denying said TAR includes denying said TAR if said purchase date and time is before said date and time that said activation instructions were received or after said date and time that said deactivation instructions were received.

29. A non-transitory, electronically-readable storage medium according to claim 28, wherein said method further includes the steps of:

establishing a third connection with said account-holder responsive to receiving a third connection request from said account-holder;

receiving reactivation instructions from said account-holder to again activate said account, said reactivation instructions being received via said third connection and subsequent to receipt of said deactivation instructions;

modifying said activation data to reactivate said account in response to said reactivation instructions; and storing the date and time that said reactivation instructions were received.

30. A non-transitory, electronically-readable storage medium according to claim 29, wherein said method further includes the steps of:

receiving a second TAR from a second merchant, said second TAR indicative of a transaction between said user and said second merchant;

determining whether said account was reactivated at a time associated with said second TAR; and approving said second TAR only if said account was reactivated at said time associated with said second TAR.

31. A non-transitory, electronically-readable storage medium according to claim 30, wherein:

said step of determining whether said account was reactivated includes comparing a purchase date and time included in said second TAR with said date and time that said reactivation instructions were received; and said step of approving said second TAR includes approving said second TAR only if said purchase date and time of said second TAR is after said date and time that said reactivation instructions were received.

32. A non-transitory, electronically-readable storage medium according to claim 27, wherein said method further includes the steps of:

storing at least one automatic deactivation criteria associated with said account-holder; and automatically deactivating said account when said at least one deactivation criteria is met.

33. A non-transitory, electronically-readable storage medium according to claim 32, wherein:

said at least one deactivation criteria includes receiving a predetermined number of TARs; and said step of automatically temporarily deactivating said account includes deactivating said account after the receipt of said predetermined number of TARs.

34. A non-transitory, electronically-readable storage medium according to claim 27, wherein said method further includes the steps of:

establishing a separate connection with said account-holder;

verifying said TAR with said account-holder via said separate connection; and approving said TAR only if said TAR is verified.

35. A non-transitory, electronically-readable storage medium according to claim 27, wherein said method further includes the steps of:

receiving at least one pre-verification criteria associated with said account-holder;

comparing said TAR with said at least one pre-verification criteria;

automatically verifying said TAR without input from said account-holder if said at least one pre-verification criteria is satisfied; and approving said TAR only if said TAR is verified.

36. A non-transitory, electronically-readable storage medium according to claim 27, wherein each time said account is activated, said account remains activated indefinitely until said account is deactivated by said account-holder.

37. A non-transitory, electronically-readable storage medium according to claim 36, wherein each time said account is activated, the duration that said account is activated is determined at the time said account is deactivated by said account-holder.

38. A non-transitory, electronically-readable storage medium according to claim 27, wherein said user is said account-holder.

39. A computer system for approving a commercial transaction between a user with account information and a merchant, said computer system comprising:

a processing unit for processing data and code; and memory for storing said data and said code, said data and said code together including means for facilitating a connection with said merchant and for receiving a transaction approval request (TAR), activation data accessible to an account-holder and indicative of the activation status of an account associated with said account-holder, means for communicating with said account-holder and for receiving instructions from said account-holder to modify said activation data;

means for modifying said activation data responsive to said instructions received from said account-holder, and means, responsive to said TAR, for denying said TAR if said is deactivated; and wherein prior to said user initiating said transaction with said merchant, said means for communicating is operative to establish a first connection with said account-holder and receive activation instructions from said account-holder to activate said account;

responsive to said activation instructions, said means for modifying is operative to modify said activation data to activate said account thereby facilitating approval of said TAR, said account being previously deactivated;

subsequent to receipt of said TAR, said means for communicating is operative to establish a second connection with said account-holder and receive deactivation instructions from said account-holder to deactivate said account;

responsive to said deactivation instructions, said means for modifying is operative to modify said activation data to deactivate said account such that subsequent TARs will be denied; and in the absence of said deactivation instructions, said account remains activated such that said subsequent TARs may be approved.

* * * * *